US009940525B2

(12) United States Patent
Wolf

(10) Patent No.: US 9,940,525 B2
(45) Date of Patent: Apr. 10, 2018

(54) IMAGE CAPTURE WITH PRIVACY PROTECTION

(71) Applicant: Mace Wolf, Laguna Beach, CA (US)

(72) Inventor: Mace Wolf, Laguna Beach, CA (US)

(*) Notice: Subject to any disclaimer, the term of this patent is extended or adjusted under 35 U.S.C. 154(b) by 0 days.

(21) Appl. No.: 15/298,946

(22) Filed: Oct. 20, 2016

(65) Prior Publication Data
US 2017/0300757 A1  Oct. 19, 2017

Related U.S. Application Data

(63) Continuation-in-part of application No. 14/084,071, filed on Nov. 19, 2013, now abandoned.

(60) Provisional application No. 61/727,899, filed on Nov. 19, 2012, provisional application No. 61/774,722, filed on Mar. 8, 2013.

(51) Int. Cl.
*G06K 9/00* (2006.01)
*H04N 7/18* (2006.01)
*H04N 5/232* (2006.01)
*G06T 7/90* (2017.01)
*H04L 9/32* (2006.01)
*G06K 9/32* (2006.01)
(Continued)

(52) U.S. Cl.
CPC ....... *G06K 9/00771* (2013.01); *G06K 9/0063* (2013.01); *G06K 9/00362* (2013.01); *G06K 9/3233* (2013.01); *G06T 7/90* (2017.01); *G06T 11/60* (2013.01); *H04L 9/3247* (2013.01); *H04N 5/23229* (2013.01); *H04N 7/183* (2013.01); *G06F 17/30259* (2013.01); *G06T 2207/10024* (2013.01); *G06T 2207/10032* (2013.01); *G06T 2207/30204* (2013.01); *G06T 2207/30232* (2013.01)

(58) Field of Classification Search
None
See application file for complete search history.

(56) References Cited

U.S. PATENT DOCUMENTS 4,267,562 A   5/1981  Raimondi
5,991,429 A   11/1999 Coffin et al.
(Continued)

FOREIGN PATENT DOCUMENTS

WO   WO2001062006   8/2001

OTHER PUBLICATIONS

Moncrieff, S., Venkatesh, S., & West, G. A. (2009). Dynamic privacy in public surveillance. Computer, 42(9), 22-28.*

(Continued)

*Primary Examiner* — Vu Le
*Assistant Examiner* — Samah Beg
(74) *Attorney, Agent, or Firm* — Quarles & Brady LLP

(57) ABSTRACT

A method of providing obscurant data includes receiving image data including an image of a target and receiving a preference setting corresponding to the target. Obscurant data of at least a portion of the image data corresponding to the target are determined using the received preference setting. A method of providing surveillance image data includes capturing image data including an image of a target, querying a database to receive a preference setting corresponding to the target, determining the obscurant data of the portion of the image data, and selectively modifying the received image data according to the determined obscurant data to provide the surveillance image data.

6 Claims, 11 Drawing Sheets

(51) Int. Cl.
*G06T 11/60* (2006.01)
*G06F 17/30* (2006.01)

(56) References Cited

U.S. PATENT DOCUMENTS

| | | | |
|---|---|---|---|
| 6,067,399 A | | 5/2000 | Berger |
| 7,181,081 B2 | | 2/2007 | Sandrew |
| 7,366,359 B1 | | 4/2008 | Davey et al. |
| 7,423,667 B2 | | 9/2008 | Hayasaka |
| 7,440,594 B2 | | 10/2008 | Takenaka |
| 7,653,259 B2 | | 1/2010 | Pilu |
| 7,893,959 B2 | | 2/2011 | Miyata |
| 7,973,821 B2 | | 7/2011 | Seo |
| 8,668,136 B2 | | 3/2014 | Ahem et al. |
| 2003/0134648 A1* | 7/2003 | Reed | H04W 60/00 455/456.1 |
| 2004/0243822 A1 | 12/2004 | Buchholz et al. | |
| 2005/0232487 A1 | 10/2005 | Fleisher | |
| 2005/0270372 A1 | 12/2005 | Henninger, III | |
| 2007/0013776 A1* | 1/2007 | Venetianer | G06K 9/00771 348/143 |
| 2007/0046439 A1 | 3/2007 | Takaku et al. | |
| 2007/0188795 A1 | 8/2007 | Chishima et al. | |
| 2008/0100704 A1* | 5/2008 | Venetianer | G06F 17/3079 348/143 |
| 2008/0117295 A1 | 5/2008 | Ebrahimi et al. | |
| 2008/0155262 A1 | 6/2008 | Beaver et al. | |
| 2009/0138402 A1 | 5/2009 | Chan et al. | |
| 2009/0154777 A1 | 6/2009 | Cincotti et al. | |
| 2009/0257589 A1 | 10/2009 | Yokota et al. | |
| 2010/0002077 A1 | 1/2010 | Viggiano et al. | |
| 2010/0026470 A1* | 2/2010 | Wilson | G06F 3/046 340/10.52 |
| 2010/0026802 A1* | 2/2010 | Titus | G08B 13/19608 348/143 |
| 2010/0328460 A1 | 12/2010 | Merkel et al. | |
| 2011/0096922 A1 | 4/2011 | Oya | |
| 2012/0189165 A1 | 7/2012 | Sun et al. | |
| 2012/0200703 A1 | 8/2012 | Nadir et al. | |
| 2013/0283061 A1 | 10/2013 | Jeong | |
| 2014/0293032 A1 | 10/2014 | Gontina | |
| 2014/0334676 A1 | 11/2014 | Skans et al. | |
| 2014/0368493 A1 | 12/2014 | Rogan et al. | |
| 2015/0220777 A1 | 8/2015 | Kauffmann et al. | |

OTHER PUBLICATIONS

Schiff, J., Meingast, M., Mulligan, D. K., Sastry, S., & Goldberg, K. (2009). Respectful cameras: Detecting visual markers in real-time to address privacy concerns. In Protecting Privacy in Video Surveillance (pp. 65-89). Springer London.*

Mihailidis, A., Carmichael, B., & Boger, J. (2004). The use of computer vision in an intelligent environment to support aging-in-place, safety, and independence in the home. IEEE Transactions on information technology in biomedicine, 8(3), 238-247.*

Hruby, If you've ever wanted to evade overhead surveillance drones—and, of course, look stylish while, The Washington Times, Jan. 23, 2013, (3 pages) The Washington Times.

Media college.com, How to Blur Part of an Image, (http://www.mediacollege.com/video/special-effects/blur/, Dec. 14, 2005, (2 Pages), IEEE Transactions on Circuits and Systems for Video Technology.

Martin, Privacy Protected Surveillance Using Secure Visual Object Coding, Aug. 2008, vol. 18, No. 8, (1152-1162).

* cited by examiner

IMAGE CAPTURE WITH PRIVACY PROTECTION

CROSS-REFERENCE TO RELATED APPLICATIONS

This non-provisional application is a continuation-in-part of U.S. patent application Ser. No. 14/084,071 (filed Nov. 19, 2013) which claims the benefit of U.S. Provisional Patent Application Ser. No. 61/727,899 (filed Nov. 19, 2012) and entitled "Image Capture with Privacy Protection," and of U.S. Provisional Patent Application Ser. No. 61/774,722 (filed Mar. 8, 2013) and entitled "Image Capture with Privacy Protection," the entirety of each of which is incorporated herein by reference.

TECHNICAL FIELD

The present application relates to image capture systems and methods, and more specifically to those responsive to inputs to selectively mask portions of their outputs.

BACKGROUND

Remote surveillance is common for security, law enforcement, intelligence, and military purposes. For example, shopping centers, police stations, and other facilities catering to the public often have closed-circuit television (CCTV) cameras or other devices monitoring members of the public in the facility. In another example, pole-mounted cameras have been used for traffic enforcement. One type of surveillance that is on the rise is drone surveillance. Unmanned aerial vehicles (UAVs, also known as "drones") are aircraft that do not carry human pilots or passengers, and are commonly used for surveillance and combat. Drones can be configured as fixed wing aircraft, helicopters, or other aerial vehicles. A human pilot generally controls a drone using a wireless link from one or more ground stations, but drones can include autonomous systems that perform the functions normally executed by a pilot. Drones serve to carry sensors and permit those sensors to interact with their environments in order to collect data. Drones can be used, for example, to carry out surveillance or intelligence-gathering missions using a variety of optical or other sensors, to transport goods or passengers, or to locate and respond to threats.

Various software exists for detecting moving objects or recognizing faces in captured image data, and then displaying an indicator of the detection. Various software also exists for tracking such detected image features as they move. Moreover, various techniques are used to improve the visibility of objects in captured image data. For example, military forces wear IR beacons in combat areas. These IR beacons blink in infrared wavelengths. This renders friendly forces visible in an IR camera view, reducing the probability of casualties due to friendly fire.

Drones can range in size from, e.g., small units weighing grams, to airplanes with wingspans over ten feet, to full-sized airplanes such as bombers. Particularly with smaller units, drones can permit covert surveillance of persons in public. For example, a drone airplane with a wingspan of approximately 10', painted appropriately, with an electric drive, can be effectively invisible and inaudible to persons on the ground at an altitude of as little as 500' above ground level (AGL). There is, therefore, a need of implementing the rights of people to be free from surveillance without cause, e.g., privacy and due-process rights, especially when the surveillance is being carried out by a small, unobtrusive drone. This need can also pertain to surveillance carried out by fixed cameras such as security or traffic cameras.

BRIEF DESCRIPTION

According to various aspects, there is provided a method of providing obscurant data, comprising:
  receiving image data including an image of a target;
  receiving a preference setting corresponding to the target; and
  determining the obscurant data of at least a portion of the image data corresponding to the target using the received preference setting.

Optionally, the obscurant data can be determined further using the received image data. The at least a portion can correspond to the image of the target. The method can include selectively modifying the received image data according to the determined obscurant data to provide a surveillance image. The determining step can include determining at least a portion of the image data to be obscured in response to a preference setting requesting privacy and the modifying step includes obscuring the determined at least a portion of the image data. The determining step can include determining at least a portion of the image to be indicated in response to a preference setting requesting increased visibility of the target and the modifying step can include modifying the determined at least a portion of the image data to include data of a visible indicator. The method can further include receiving a unique identifier of the target. The step of receiving a preference setting can include transmitting the received unique identifier to a database and receiving from the database the preference setting corresponding to the unique identifier. The image data can correspond to a visibility region, and the step of receiving a preference setting step can include transmitting data of the visibility region to a database to determine whether the target is present in the visibility region; and receiving from the database the preference setting or an indication that the target is not present in the visibility region. The method can further include transmitting to a database a timestamp corresponding to the image data. The method can further include storing the determined obscurant data in a storage device. The storage device can be a tamper-evident storage device. The target can be selected from the group consisting of a person, a building, a vehicle or an animal, the determining step can include determining a size of the at least a portion of the image data using the received image data. The method can further comprise receiving a validity period of the unique identifier and determining that the at least a portion of the image data should be obscured only if a present date or time is within the validity period or authenticating the unique identifier with respect to selected authority data. The authority data can include a cryptographic key and the authenticating step can include validating the unique identifier using the cryptographic key and a digital signature of the unique identifier.

According to various aspects, there is provided a method of providing surveillance image data, comprising:
  capturing image data can include an image of a target;
  querying a database to receive a preference setting corresponding to the target;
  determining obscurant data of at least a portion of the image data corresponding to the target using the received preference setting; and
  selectively modifying the image data according to the determined obscurant data to provide the surveillance image data.

Optionally, the obscurant data can be determined further using the received image data. The at least a portion can correspond to the image of the target. The image data can correspond to a visibility region. The querying step can include querying the database based on the visibility region to determine whether a target is present in the visibility region, and performing the determining and modifying steps for the target determined to be present. The querying step can include providing to the database coordinates of a visibility polygon corresponding to the visibility region. The querying step can include receiving from the database data a masking layer representing one or more area(s) to be masked and the determining step can include determining coordinates in the image data corresponding to the area(s). The method can further include receiving an identity of the target and storing the received identity in association with the preference setting in the database. Multiple sets of preference setting and target identity can be received and stored in the database. The method can further include receiving a unique identifier corresponding to the target, the querying step can include transmitting the unique identifier to the database. The receiving-identifier step can include transmitting a radio-frequency (RF) interrogation signal and receiving an RF identification signal in response, the RF identification signal can include data of the unique identifier. The receiving-identifier step can include receiving the unique identifier from a location provider. The method can further include locating a tag of the target in the image data and decoding a target identifier of the tag, the target identifier visually represented in the image data. The querying step can include transmitting the decoded target identifier to the database. The determining step can include determining the obscurant data using the received image data and the received preference setting. The method can further comprise receiving a validity period of the unique identifier and determining that the at least a portion of the image data should be obscured only if a present date or time is within the validity period or authenticating the unique identifier with respect to selected authority data. The authority data can include a cryptographic key and the authenticating step can include validating the unique identifier using the cryptographic key and a digital signature of the unique identifier.

According to various aspects, there is provided a surveillance device comprising:
  a communications device adapted to receive image data and identification data of a target visible in the image data; and
  a processor adapted to receive the image data; to receive a preference setting corresponding to the identification data; and to selectively modify at least a portion of the image data corresponding to the target according to the preference setting.

Optionally, the processor can be adapted to modify the image data to obscure the target in the image data in response to a preference setting requesting privacy. The processor can be adapted to modify the image data to indicate the target in the image data in response to a preference setting requesting increased visibility. The device can further include a delivery system adapted to provide the modified image data. The communications device can include a network transceiver and the processor can be adapted to receive the preference setting via the network transceiver. The identification data can include a unique identifier of a target or a location of a target. The identification data can include a unique identifier associated with a cryptographic signature or a validity period, e.g., as discussed above, for validity-period checking or signature validation. Validity periods and signatures can be combined.

According to various aspects, there is provided a surveillance device comprising a processor adapted to receive image data, identification data of a target visible in the image data, and a preference setting corresponding to the identification data; and to selectively modify at least a portion of the image data corresponding to the target according to the preference setting. Optional features described above can also be used in combination with the surveillance device, e.g., obscuring the target in the image data, providing the modified image data using a delivery system, receiving the preference setting via a network transceiver, or the identification data including a unique identifier or location of a target. The identification data can include a unique identifier associated with a cryptographic signature or a validity period.

According to various aspects, there is provided a surveillance system, comprising:
  an image-capture device adapted to produce image data of a scene;
  a database adapted to store preference setting(s); and
  a surveillance device as described above.

Optionally, the surveillance device in the surveillance system can be adapted to receive the image data from the image-capture device. The processor of the surveillance device can be adapted to receive the identification data and to transmit a query to the database, the query can include the identification data, and the database can be adapted to receive the query from the processor and transmit a corresponding stored preference setting to the processor. The image-capture device can be further adapted to produce the associated data indicating a visibility region of the image-capture device, the database can be further adapted to store the respective preference settings of one or more target(s) and respective location(s) of those targets and to respond to the query with the preference setting and location of a target within the visibility region, and the processor can be further adapted to modify the at least a portion of the image data corresponding to the visibility region and the location only if the preference setting indicates such modification should be performed. The database can be further adapted to receive a user input and a unique identifier of the target and to store the user input as the preference setting corresponding to the unique identifier. The database can be further adapted to receive the unique identifier and the location of the target and to store the received location in association with the received unique identifier, so that the database responds to the query by determining one or more unique identifier(s) having location(s) within the visibility region. The surveillance system can include a location provider adapted to periodically provide the location of the target to the database. The identification data can include a unique identifier associated with a cryptographic signature or a validity period and the database can be further adapted to store information relating to the cryptographic signature or the validity period.

According to various aspects, there is provided a method of providing surveillance image data, comprising:
  receiving image data can include an image of a target;
  receiving a preference setting corresponding to the target; and
  selectively modifying at least a portion of the image data corresponding to the target according to the preference setting to provide the surveillance image data.

Optionally, the method can further include querying the database to determine whether a target is present in the visibility region, and performing the modifying step when the target is present or with respect to the target determined to be present. The querying to determine whether a target is present can include providing to the database coordinates of a visibility polygon corresponding to the visibility region. The modifying step can include obscuring the at least a portion of the image data in response to a preference setting requesting privacy. The method can further include receiving the preference setting and an identity of the target and storing the received setting and identity in the database. The method can further include capturing the image data and querying a database to receive the preference setting. The method can further include receiving an identifier of the target and validation information of the identifier and determining whether a use of the identifier satisfies the validation information.

Various aspects described herein advantageously provide systems for and ways of determining that a person or other object should not be tracked by a drone or other optoelectronic surveillance or tracking device, and of blocking data captured by such drones or devices. Various aspects provide that a person or other object should be rendered more visible on surveillance imagery. Various aspects advantageously permit individuals to select the level of privacy they desire with respect to systems described herein or systems implementing methods described herein. Various aspects operate using devices, e.g., cellular telephones, that users may already have. Various aspects use no personally-identifiable information, so that the identity of a person requesting privacy is not stored. Various aspects include storing preferences regarding privacy in a database. Various aspects include storing preferences regarding privacy in a memory in a tag, or encoding those preferences in the structure, shape, or color of a tag or in a detectable (e.g., human- or machine-visible) pattern arranged over the surface of the tag.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION

In the following description, some aspects will be described in terms that would ordinarily be implemented as software programs. Those skilled in the art will readily recognize that the equivalent of such software can also be constructed in hardware, firmware, or micro-code. Because image manipulation algorithms and systems are well known, the present description will be directed in particular to algorithms and systems forming part of, or cooperating more directly with, systems and methods described herein. Other aspects of such algorithms and systems, and hardware or software for producing and otherwise processing the image signals involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Various aspects use a cell phone as a transponder by registering the phone's location in a registry or database. This can be done using an app that runs on the cell phone and updates the registry periodically, as discussed herein. Various aspects described herein advantageously test identified targets against the database. Targets that should be blocked are obscured by cones (or other shapes) of non-observation added to the image data, or are otherwise blocked from view. In various aspects, properties or settings, e.g., user preferences, are stored with the location in the registry.

Various aspects use materials of a certain shape or colors of a certain pattern to anonymously identify targets to be blocked from view. Some of these aspects do not use a phone as a transponder and do not use a registry. Areas of a meaningful pattern or color in the image data are advantageously obscured, as are image-data features around them. Various aspects keep both the unmodified image data and the modified image data that result from obscuration or blocking of targets. Various aspects provide indicators that enhance the image of a target or other object to improve visibility or to capture other properties of the target such as identification or direction of travel.

Figure 1:
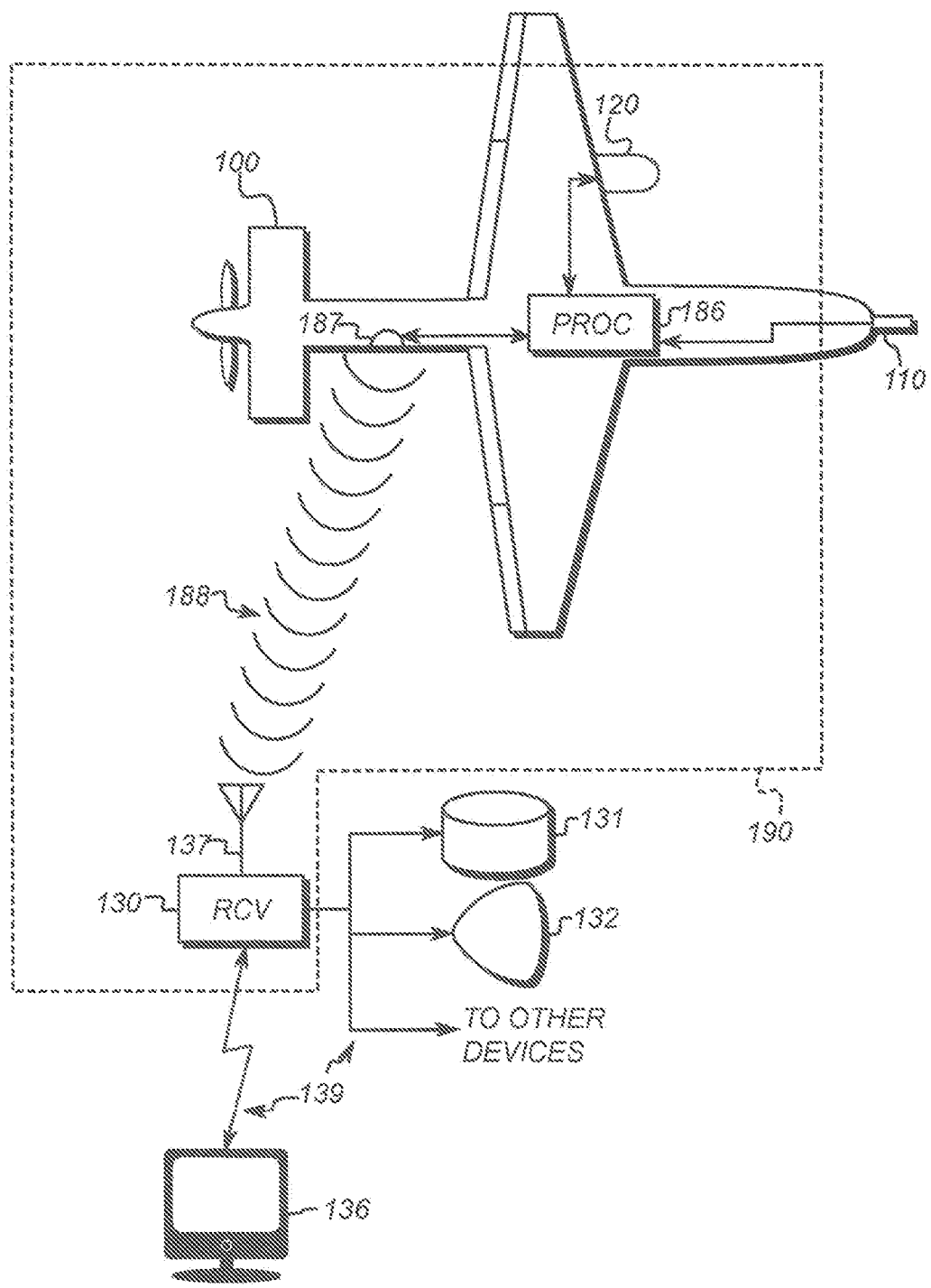
FIG. 1 shows an imaging platform and an imaging system according to various aspects.

FIG. 1 shows an imaging platform and an imaging system according to various aspects. Imaging platform 100 include, e.g., a drone such as an airplane UAV. Imaging platform 100 can also include any other type of drone or a fixed camera, e.g., a mall security camera, bridge-inspection camera, or traffic-light camera. Imaging platform 100 can also include a portable surveillance device, e.g., GOOGLE GLASS or another head-mounted image-capture device, a video camera or other hand-held image-capture device, or another electronic image-capture device, whether or not designed to operate in the visible light range of ~400-700 nm. In various aspects, imaging platform 100 is autonomous, so processor 186 controls the operational functions of imaging platform 100. In other aspects, imaging platform 100 is controlled from a ground station. Imaging platform 100 can be a module connected to another system such as a passenger airplane, and likewise throughout. Imaging platform 100 can have a total weight of, e.g., 2-5 lbs, or several grams.

Imaging platform 100 can have a maximum length of, e.g., 2-3". Imaging platform 100 can include an airplane, such as a drone, a passenger airplane (piston or jet), or a military aircraft (e.g., a fighter, bomber, reconnaissance airplane, or combination thereof; a microlight such as an insect-sized drone; a blimp; a free balloon; or other configurations). Imaging platform 100 can include a helicopter, a robot, or a missile. Imaging platform 100 can include a ground vehicle, water craft or underwater craft, e.g. an automobile, ship or submarine, respectively, or a space craft or a satellite. Imaging platform 100 can be remotely controlled (non-autonomous), autonomous, or semi-autonomous. For example, a semi-autonomous drone can navigate using on-board sensors and computers along a sequence of way-points provided by a ground controller. In another example, if contact with the ground controller is lost, a semi-autonomous drone can fly a holding pattern at its present location or a selected location, or can follow a predetermined path to a landing field. In another example, the drone is a blimp with a propulsion unit, and if contact with the ground controller is lost, the drone uses the propulsion unit to remain substantially stationary.

Imaging platform 100 includes image-capture device 110, e.g., an optoelectronic device such as a CMOS or CCD image sensor, or a spectrophotometer or spectroradiometer. Image-capture device 110 provides the captured image to processor 186. Image-capture device 110 can include optical or digital zoom devices. Processor 186 can also receive data from optional sensor 120, e.g., an RF sensor, as discussed below. Sensor 120 can include transmit electronics controlled by processor 186. In the example shown, image-capture device 110 and sensor 120 are located in wing pods mounted on an aircraft drone. Image-capture device 110 or other sensors, e.g., sensor 120, can be mounted on the bottom or top of, or elsewhere on, or located in the fuselage, on the tail, or in other locations, of an aircraft drone or other imaging platform 100.

Processor 186 transmits the received image from image-capture device 110 via communications device 187. In the example shown, communications device 187 includes an antenna, but it can also include a wired transceiver, e.g., an Ethernet transceiver. The received image is transmitted via data link 188 to communications device 137. In this example, data link 188 is wireless, e.g., GSM, WiFi, free-space laser, or LNS public-safety radio in the 800 MHz or 900 MHz band, or another UHF or VHF band, and communications device 137 includes an antenna. Data link 188 can also include a cable or optical fiber and communications device 137 a transceiver. Data link 188 can include a communication link including a physical connector, such as an optoelectronic communication wire, or including a non-physical connector such as a wireless connection, for example a radio or microwave link. Data link 188 can also Data link 188 can be encrypted, or data transmitted over data link 188 can be encrypted (e.g., using the Secure Sockets Layer, SSL, Internet protocol or other secured-transfer protocols), or both.

Receiver 130 receives the image data from communications device 137. Receiver 130 can include, e.g., a ground station for a drone or a control terminal for a security system. Receiver 130 can dispatch the received image data to storage 131 (e.g., a hard-disk drive or writable optical drive), display 132 (e.g., an OLED or CRT display), or other devices (e.g., other processors, controllers, or drones). Dispatch can be carried out over other network links. Receiver 130 can include a personal computer or embedded system. Receiver 130 can be under the control of an individual, e.g., person 222 (FIG. 5), or the operator of imaging platform 100.

Image-capture device 110, optional sensor 120, processor 186, communications device 187, data link 188, communications device 137 and receiver 130 together compose imaging system 190. Imaging system 190 delivers captured images to desired outputs, e.g., storage 131 or display 132. For example, receiver 130 can include a drone ground station, and personal computer 136 can be connected over the Internet or another network to receiver 130 to permit a person or computer system to access data from imaging system 190. Delivery system 139 can deliver the image data, and can include a storage or display interface, network link, Internet connection, or other device for connecting to a device that is to receive the delivered data. The imaging platform 100 can include components not part of imaging system 190, e.g., a propulsion system.

Imaging system 190 can include processing components. Processor 186 or receiver 130, or other components of imaging system 190, can modify image data before it is delivered, or can produce additional outputs overlaid on, displayed along side, or delivered with the image data. The term "processing component" refers to any processor, controller, microcontroller, firmware, hardware, or programmable logic in imaging system 190 capable of performing operations described herein. The term "processor" can include multiple such devices connected by a data link and operating together to perform a function described herein.

Figure 2:
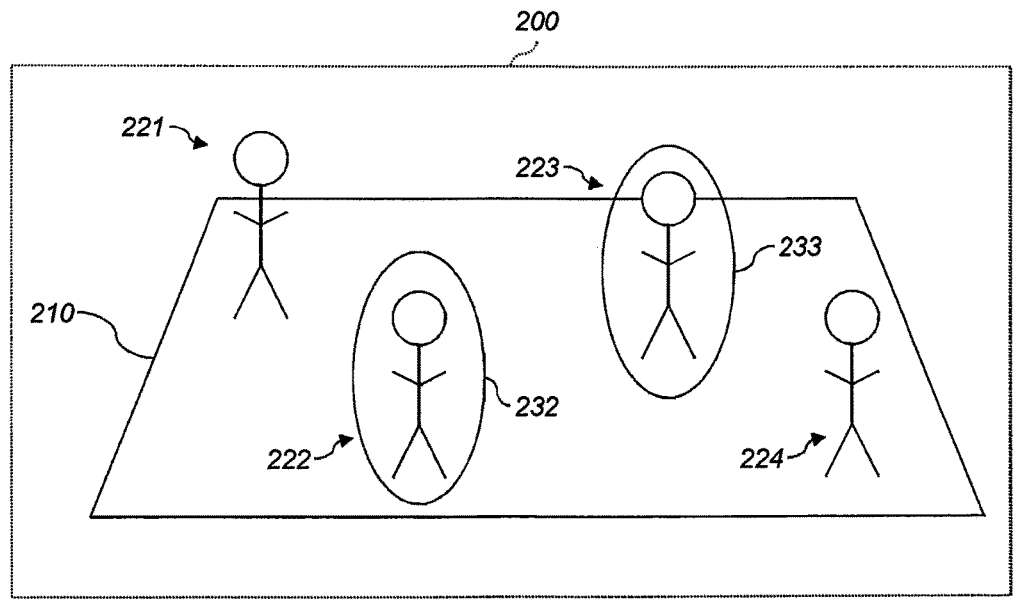
FIG. 2 shows an exemplary video frame captured by a capture system.

FIG. 2 shows an exemplary video frame 200 captured by a capture system. Everything herein related to video frames also applies to still images, and vice versa. Walking on surface 210 (e.g., a sidewalk) are persons 221, 222, 223, 224. Receiver 130, or other components of imaging system 190, processes image data for the image using analysis routines in hardware, firmware, software, or a combination. The analysis routines have determined, in this example, that persons 222 and 223 are of interest, as discussed below. Overlaid on the video frame are indicators 232, 233. These can be shaped like ovals, rectangles, or other shapes, and can be steady, colored, glowing, blinking, noise (e.g., similar to the "snow" or "static" visible on an NTSC color TV tuned to a dead channel) or otherwise visually distinct from the image data. Persons 221 and 224 are not of interest, so no indicators are shown for them. The analysis routines can determine the size of indicators 232, 233 by inspection of the image data, e.g., to determine what portion(s) of the image data is (are) moving and is (are) a different color than the background (surface 210).

In various aspects, processor 186, receiver 130, or another component of imaging system 190 can analyze the captured image data to locate persons of interest or other objects or features of interest, and can output data that will result in indicators 232, 233 being stored on storage 131 or displayed on display 132 (all FIG. 1). Software from ESRI or other vendors can be used to detect features of interest in a frame based on color. In video captures, adjacent frames can be compared and moving image-data features can be evaluated for whether they are of interest. Comparing successive image frames can also be used to estimate the size of the object potentially of interest. The determined size of the object of interest can be used to determine the size of indicators 232, 233. These aspects can be combined with aspects using tags 542, 543, which are discussed below.

Figure 3:
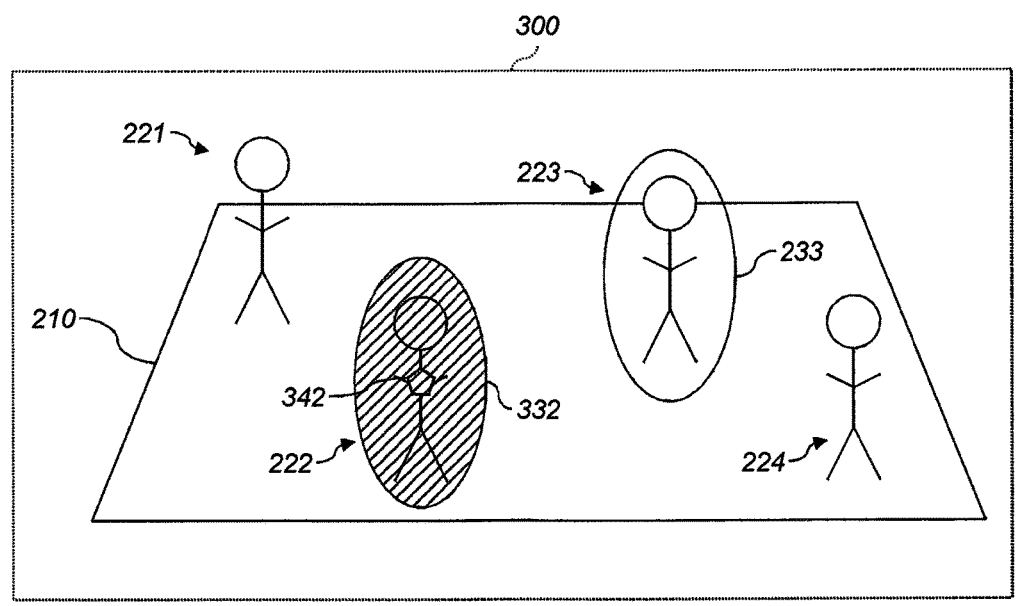
FIGS. 3 and 4 show an exemplary video frame captured by a capture system according to various aspects.

FIG. 3 shows an exemplary video frame 300 captured by a capture system according to various aspects. Surface 210 and persons 221, 222, 223, 224 are as shown in FIG. 2, as is indicator 233. However, person 222 is bearing tag 342.

Tag 342 is visible in the image data captured by imaging system 190 and indicates to the capture system that image data of the bearer of tag 342 should not be available for use. Obscurant 332 is displayed over person 222. Obscurant 332 can be solid black, colored, glowing, blinking, or otherwise visually distinct from the image data. Obscurant 332 can be, e.g., an oval, rectangle, or other shape, e.g., the same shape and sizes as indicator 232 (FIG. 2). Obscurant 332 can modify the image data by superimposing content, as in the previous sentences, or by blurring, smearing, or otherwise distorting the image data of person 222 to render it unrecognizable. The effect of any obscurant described in this disclosure is to modify, in some way, the image data eventually displayed to a person watching the surveillance video, so that person 222 is not readily identifiable from the video seen by the person watching. Persons 221 and 224 are not of interest, so no indicia are shown. Obscurant 332 can be applied by any processing component of imaging system 190, e.g., processor 186 or receiver 130. Obscurant 332 can also be applied by display 132 in response to data provided by imaging system 190 indicating the size and position of obscurant 332.

Obscurant 332 is shown hatched here so that tag 342 is visible. Obscurant 332 can also be opaque, showing none of the image data obscured by it. As long as tag 342 is visible in the image data from image-capture device 110, a selected component of imaging system 190 will apply obscurant 332. This can advantageously be performed without requiring any database or information about the object or person of interest. Person 222 thus is shielded, e.g., from surveillance carried out without a search warrant, by wearing or carrying tag 342. Person 222 does not have to register with any database or agency, and does not have to take any action other than bearing tag 342 to increase his privacy. In some aspects, video frame 300 including obscurant 332 is stored, so no data is stored regarding person 222. In other aspects, frame 300 is stored, and data corresponding to obscurant 332 are separately stored. This permits normal display of frame 300, in which person 222 is not visible. This also permits display of stored frame 300 without obscurant 332, e.g., when ordered by a court.

Tag 342 include material of a particular color or that emits or reflects a particular wavelength of light. Tag 342 can also be marked with a particular pattern, e.g., a 1D or 2D barcode such as a QR code. Person 222 can wear tag 342 as a badge on a lanyard around his neck, or attached to a belt loop. Tag 342 can be credit-card- or business-card- or key-card-sized. Person 222 can wear tag 342 as a pin or badge clipped or otherwise affixed to an article of clothing, e.g., a hat or a lapel. Tag 342 can be ~1"×1". Tag 342 can be an integral part of an article of clothing. For example, just as hunters wear hunter-orange clothing, person 222 can wear a hat, shirt, or other article of clothing that is a specific color, or that includes an area of a specific color. The larger tag 342 is, the greater range at which the image of tag 342 captured by image-capture device 110 will be at least one pixel in size, or otherwise detectable by processor 186 or another processing device. Imaging system 190 cannot respond to tag 342 if tag 342 is not detectable in a given video frame 200, given the size of tag 342, the resolution of image-capture device 110, and the distance between image-capture device 110 and tag 342. In an example, a helicopter-mounted image-capture device 110 can have a resolution of at least 1280×720 over an area ~1 yd$^2$ at a distance of ~15 mi. In another example, an image-capture device 110 on a drone can have a visual range of ~9 mi. when the drone is flying at ~15,000' (~4.572 km) AGL. In various aspects, tag 342 carries other encoded information, e.g., the tail number of an aircraft or the car number of a police car. Imaging system 190 can recognize and decode this additional information, and transmit it to receiver 130, database 599 (FIG. 5), or other components, along with image data or obscurant data, or separately from those types of data. For example, the imaging system 190 can determine the unique ID values of mobile telephones in its field of view, communicate all the determined ID values to receiver 130, and only obscure or indicate the areas around those mobile telephones that correspond to targets expressing a preference (e.g., in database 599) with respect to surveillance.

In various aspects, imaging system 190 responds to tag 342 as long as the color of tag 342 covers at least one pixel, or covers enough of several adjacent pixels to be discernable. In various aspects, tag 342 blinks or strobes in a wavelength visible to image-capture device 110, which wavelength can be visible to humans or not.

Figure 4:
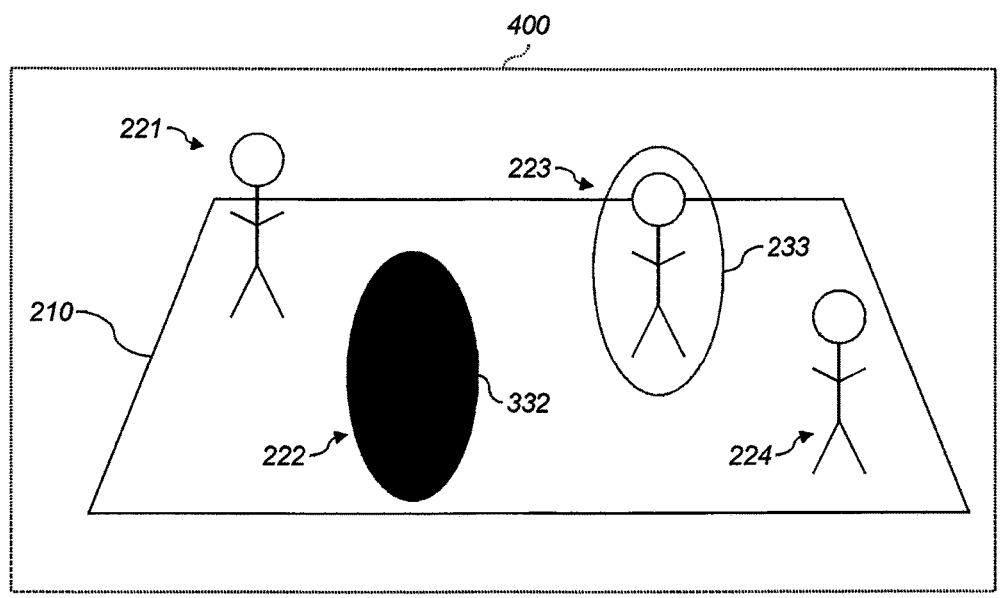

FIG. 4 shows exemplary video frame 400. This is as video frame 300, but obscurant 332 is completely opaque. As a result, person 222, who is bearing tag 342, is not visible to a person watching video frame 400 on display 132. In some aspects, storage 131 receives video frame 400 including obscurant 332, so no data is stored regarding person 222. In other aspects, storage 131 stores frame 200, and separately stores data corresponding to obscurant 332. This permits normal display of frame 400, in which person 222 is not visible. This also permits display of stored frame 200 without obscurant 332, e.g., when ordered by a court.

In various aspects, different colors or patterns of tag 342 can have different meanings. In an example, one color or pattern can mean "do not track me," as shown in FIGS. 3-4. Another color can mean "please do track me." Another color can be a distress signal. Tag 342 can have two sides or configurations. Person 222 can therefore adjust the configuration of tag 342 or flip tag 342 over to change from do-not-track to please-help-me mode. Imaging system 190 will indicate that tag 342 in a distress or please-help color indicates a person of interest and will apply an indicator similar to indicator 233. In an example, policemen or security guards can wear tags 342 of a particular color different from the do-not-track color. This permits readily locating them in captured images. For example, if security guards at a sporting event, e.g., a baseball game, wear tags 342 of a particular color or pattern, imaging system 190 will be able to readily locate them in captured images, even when facial recognition technology would be overwhelmed by the number of faces in close proximity in the image.

Tags 342 can be placed on objects, plants, or animals in addition to on people. Tag 342 can be applied, e.g., to a house or car. In various aspects, data from imaging system 190 is available to a person using personal computer 136, e.g., using a database client such as a SQL client, or a Web browser, e.g., FIREFOX. That person can place a "please track" tag on his house to cause imaging system 190 to record data about the tagged house every time imaging platform 100 captures an image of the tagged house. This permits the person to determine the times and frequency of drone visits.

Figure 5:
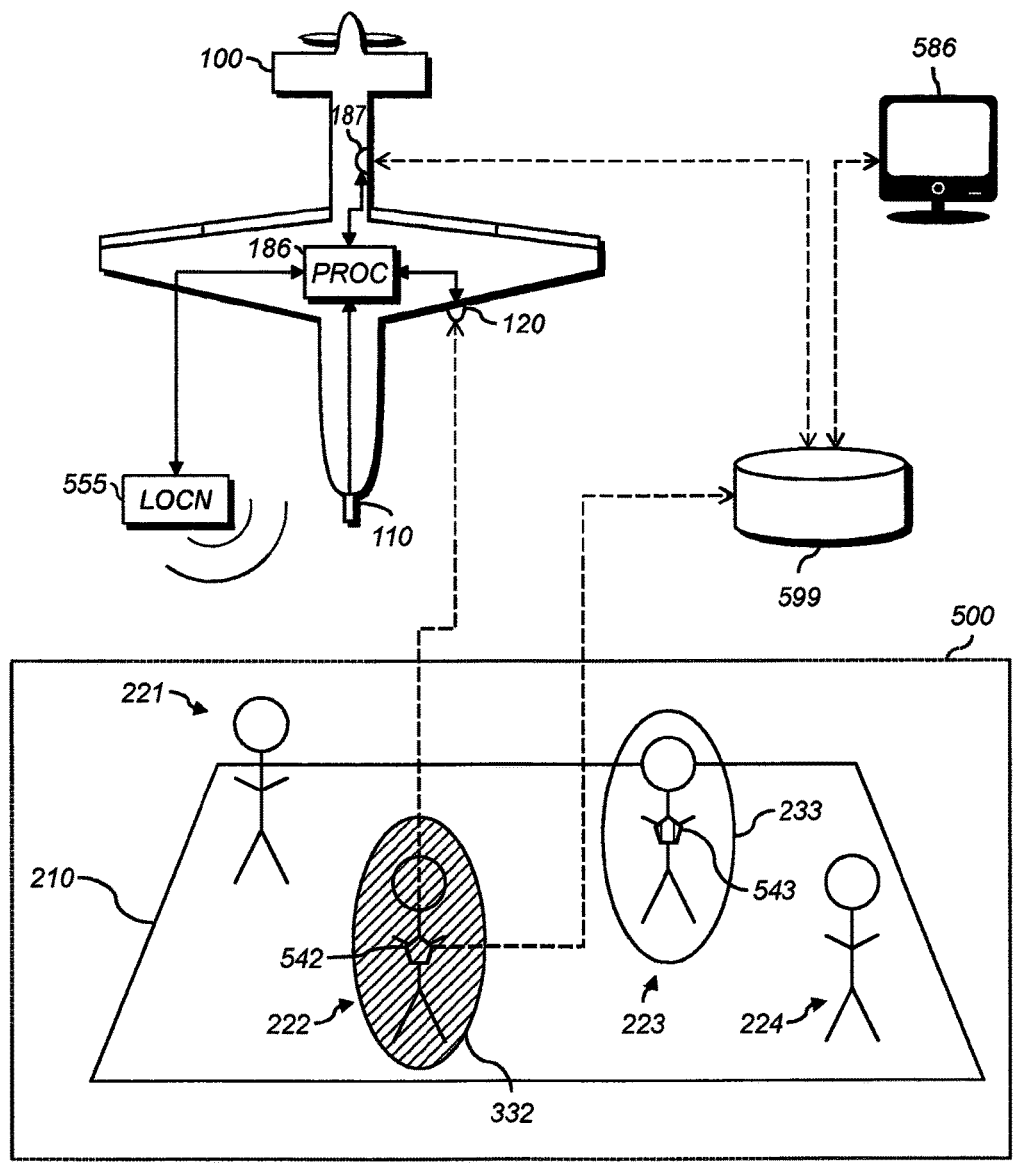
FIG. 5 shows an exemplary video frame and imaging platform according to various aspects.

FIG. 5 shows video frame 500 and imaging platform 100 according to various aspects. Imaging platform is as in FIG. 1, and includes sensor 120. Video frame 500 is as frame 300 (FIG. 3) except as indicated and described herein. Data links are shown dashed for clarity.

Person 222 is wearing, carrying, or otherwise bearing tag 542, e.g., attached to or as part of an article of clothing, or in a pocket, purse, handbag, briefcase, suitcase, or other article of luggage. Tag 542 can be visible to image-capture device 110, but that is not required. In various aspects, tag 542 is not visible to image-capture device 110. Tag 542 can include a data terminal ("DT"), e.g., a cellular telephone, or a beacon.

Tag 542 communicates periodically with database 599, e.g., every second, 10 seconds, 30 seconds, minute, two minutes, five minutes, or another interval. The interval can be configured by a user, e.g., person 222. The user can configure the interval based on his velocity and desired battery life. If the user is moving quickly, e.g., on a motorcycle, using a shorter interval provides improved privacy since obscurant 332 more closely tracks the location of person 222. However, more-frequent updates can drain a battery of tag 542 more quickly than less-frequent updates. Tag 542 can include a user interface, e.g., a touchscreen or scroll wheel, that permits person 222 to change the interval. Tag 542 can also interact with a World Wide Web (WWW) server or smartphone app that relays a command from the user to tag 542 to change the interval. In aspects in which tag 542 includes a smartphone, an interval-changing app can run on tag 542.

In various aspects, tag 542 includes a unique identifier, e.g., a SIM card number or MAC address. The unique identifier of tag 542 can be correlated with the identity of person 222 (as would be, e.g., a cell-phone number), or not (e.g., a universally-unique identifier, UUID, or globally unique identifier, GUID, uniquely created for the tag and not correlated in any database with any information about person 222). Tag 542 also includes a location-sensing device, e.g., a GPS receiver or antenna (e.g., cell-phone-tower or WiFi-hotspot) triangulator. In various aspects, periodically, tag 542 determines its location and updates database 599 with the determined location and the unique identifier. In other aspects, a service provider periodically updates database 599 with the location of tag 542. In an example, tag 542 includes a cellular telephone or other device communicating via a cellular network. The provider of cellular service periodically triangulates the location of tag 542 using multiple base-station antennas and updates database 599 with the triangulated location and the unique identifier (e.g., telephone number or SIM card number) of tag 542. This can be automatically performed by a processor operated by the service provider. Antennas or other detection units not part of imaging platform 100 and useful for triangulating or otherwise determining the location of tag 542 are represented graphically as location unit 555.

Database 599 also includes a do-not-track flag for each unique identifier. Database 599 can include other flags for each unique identifier, and can be organized for rapid searches by location. "Flags" can be binary values (on, applied, or set vs. off, not applied, or clear), integers, strings, or other data types. For example, setting or applying the do-not-track flag indicates a desire not to be tracked. Clearing the flag indicates a lack of that desire, but does not necessarily indicate an affirmative desire to be tracked. Such a desire can be indicated by a please-track flag. In various aspects, however, binary flags can be used to indicate affirmative desires. For example, a "tracking" flag can be set to indicate a desire to be tracked and clear to indicate a desire not to be tracked.

In various aspects, instead of tag 542, a remotely-detectable biometric or physical property serves to identify targets. For example, humans can be identified through face recognition, pets can be recognized through automated recognition of fur patterns, and buildings can be identified through automated recognition of their shape and color scheme. Many buildings, such as the Empire State Building in New York City, the Sydney Opera House, the Esplanade Concert Hall (the "Big Durian") in Singapore, have unique and recognizable shapes. Just as tags 342, 542 can be recognized by shape or color, and information can be decoded from the captured image of a tag 342, 542, targets can be recognized by shape or color, and information decoded from the captured images of those targets. In addition to or instead of a unique ID such as a phone number, data representing a person's face or other visually-discernable (to human or machine) characteristic of a target, e.g., shape or color of the target or a tag on the target, can be used as a unique ID to query the database for a preference setting corresponding to the target.

As imaging platform 100 operates, it communicates via a link (e.g., a wireless link through communications device 187) with database 599. Imaging platform 100 periodically communicates to database 599 the location(s) currently in view of image-capture device 110. For example, processor 186 can query the database with a visibility region of image-capture device 110, i.e., the region the image-capture device 110 can see. The visibility region can be communicated as a visibility polygon, each node of which is located at specific (e.g.) WGS84 latitude and longitude values (and optionally elevation values). Locations inside the visibility polygon are visible in the image captured by image-capture device 110. The visibility polygon can be a quadrilateral or cone. The visibility polygon can include arcuate segments, either expressed exactly or approximated with a plurality of nodes.

Database 599 responds to the visibility-polygon query from processor 186 with the coordinates of each tag that is located in the visibility polygon and to which the do-not-track flag has been applied. In the example shown, database 599 provides the coordinates of tag 542 to processor 186. Processor 186 then modifies the image data, or produces appropriate data, to provide obscurant 332. Obscurant 332 can be a generic shape (and size), a shape or size based on the distance between image-capture device 110 and tag 542, a shape or size stored in database 599, or any combination thereof. Processor 186 can transmit the obscurant data or modified image data, e.g., via the communications device 187, or can store the obscurant data or modified image data for later downloading or processing.

In various aspects, person 222 can use personal computer (PC) 586 to apply or remove the do-not-track flag or other flags or information in database 599. Database 599 can thus be a registry of privacy information.

In other aspects, imaging platform 100 can determine locations and unique IDs of targets in its field of view, e.g. using sensor 120. Imaging platform 100 can then query database 599 with those IDs, instead of or in addition to querying the database with a visibility polygon. The result of a query can be a preference setting, and imaging platform 100 can provide obscurant data or modified image data corresponding to the received preference settings and determined locations. In other examples, imaging platform 100 transmits the unique IDs and locations, or the preference settings and locations, to receiver 130 or other components of imaging system 190; the component receiving the information can provide the obscurant data or modified image data.

In various aspects, database 599 is not used. Instead, imaging platform 100 interrogates the areas in the visibility polygon using sensor 120, which can include a transceiver. Tag 542 detects an interrogation signal from sensor 120 and responds with its coordinates and do-not-track flag setting.

In various examples, tag 542 only responds if the do not track flag has been applied; in other examples, tag 542 responds whether or not the flag has been applied. Processor 186 receives tag 542's data from sensor 120 and applies obscurant 332 (or produces corresponding data) corresponding to the reported location from tag 542.

In various aspects, tag 542 includes a transponder. Tag 542 responds to the interrogation signal from sensor 120 with its unique ID. Processor 186 queries database 599 with the received unique ID. If the do-not-track flag has been applied to that unique ID, obscurant 332 is applied (or corresponding data are produced). Database 599 can be updated to indicate that tag 542 was observed at a particular place and time by a particular imaging platform 100. Each imaging platform 100 can have a unique ID (e.g., for aircraft, tail number; or, in general, GUID or other unique ID). In various aspects, sensor 120 includes a radar that can query transponders in range.

In various aspects, tag 542 includes an RFID tag and sensor 120 includes an RFID reader adapted to read tag 542. In various aspects, the transponder in tag 542 broadcasts the location of tag 542. In various aspects, sensor 120 estimates the location of tag 542, as described herein. In various aspects, multiple imaging platforms 100 can combine results from sensor 120 to estimate locations of tags 542. For example, three imaging platforms 100, each with a GPS or other device that provides the location of imaging platform 100 to respective processor 186, can communicate with each other to triangulate the location of tag 542 within the detection range of each of them.

In other aspects, tag 542 broadcasts its location, do-not-track status, and optionally its unique ID periodically, intermittently, or continually. Processor 186 listens for those broadcasts using sensor 120 and applies an obscurant or provides data relating to an obscurant. Processor 186 can, additionally or alternatively, update an internal data store with the received locations of tags 542 in the visibility polygon, and produce obscurants or obscurant data using the information in the data store. The contents of the data store can be transmitted through imaging system 190. Any processing component of imaging system 190, e.g., processor 186, can interpolate motion between successive broadcasts from a given tag 542 to estimate where the obscurant should be located at any given time. Alternatively, the obscurants can remain fixed at the last-received position.

Aspects in which tags 542 broadcast, or respond to sensor 120 with, only their location and flags, and not their unique identifiers, advantageously reduce the need for storage of personally-identifiable information about the movements of person 222. Some aspects using database 599 can advantageously permit person 222 to adjust drone activity as desired by updating the database. This can permit using a simple, robust tag 542 with no user interface.

In various examples, sensor 120 snoops signals from mobile telephones or other portable electronic devices near the imaging platform 100, or interrogates such devices, e.g., using a base station included in imaging platform 100. Sensor 120 determines the location of each device located, e.g., by rasterizing a directional antenna across the field of view of the image-capture device 110. The imaging platform 100 (or, e.g., the receiver 130) then retrieves the preference setting for the determined unique ID from the database. In these examples, the database 599 can store target locations or not, and in some examples, database 599 holds no location data. Processor 186 or, e.g., receiver 130, then produces obscurant data or modifies image data.

In various examples, such devices, e.g., tag 542, update locations in database 599. Imaging platform 100, e.g., a drone, queries database 599 with a visibility region or other field-of-view data, and database 599 responds with the locations to be obscured or indicated. This permits building a drone with simpler, possibly less costly electronics. In these and other examples throughout, database 599 can include locations of untagged targets to be obscured or indicated. Targets do not have to be tagged as long as they are in the database. Such untagged targets can include buildings or other fixed structures or areas, or can include moving targets that periodically update database 599, e.g., using a smartphone app as described below.

In various examples, database 599 can indicate that person 222 bearing tag 542 wishes to know the last time a drone observed tag 542. Information regarding the last-observation time can be stored in database 599 by processor 186 while imaging platform 100 is operating, and can be retrieved by person 222 using PC 586. The last-observation time can be stored by a command from the processor or autonomously by database 599, e.g., using a trigger on queries for flags of tag 542. Tags 542 can also be applied to non-humans, as discussed above. In some aspects, database 599 can thus be queried for the last time imaging platform 100 observed a house bearing a record-visit-timestamp tag. Flags in database 599 can also cause processor 186 to update database 599 with information about the location at which tag 542 was most recently observed, or with a photo of the bearer of tag 542 at the time of observation (a crop from the captured image). The timestamp can have a desired granularity, e.g., year, month, day, minute, second, or millisecond. The timestamp can correspond, e.g., to the image data captured by the drone or other imaging platform 100 observing tag 542.

In any of the aspects described herein, data can be stored in storage 131 or database 599 for a selectable amount of time, e.g., 180 days. Database 599 can include flags directing data to be stored longer. When retrieving captured images from database 599 or storage 131, the flags in database 599 can be consulted to narrow down the search rapidly to unique IDs with do-track fields set. In an example, parents can set the do-track fields on tags carried by their children so that they will have a record of their children's movements.

As discussed above, in some aspects, storage 131 stores frame 200, and separately stores data corresponding to obscurant 332. Normally, image data are only provided with obscurant 332 in place. In various aspects, storage 131 stores the unique ID associated with a given obscurant 332. An interface (not shown) receives a user input indicating that the user wishes to voluntarily waive blocking of the unique ID of his tag at a specific place or time, or in a given range of places or times, or in general. Storage 131 then provides image data without obscurant 332 in the desired place or time or range thereof. Imaging system 190 can also include these functions. Receiver 130 can receive the user input and provide to display 132 image data in which obscurant 332 is in place except in the selected place(s) or time(s).

In various aspects, video frame 500 includes do-track features of interest, or both do-track and do-not-track features of interest. In the example shown, person 223 is wearing or carrying do-track tag 543, and so is highlighted with indicator 233. If obscurant 332 and indicator 233 overlap, obscurant 332 can override the overlapping portions of indicator 233, indicator 233 can override the overlapping portions of obscurant 332, the overlap area can be bisected to reduce the size of both obscurant 332 and indicator 233, or a choice of which action to take can be given to an operator of imaging system 190. In various aspects, whether person 222 or person 223 is closer to image-capture device 110 can be used to make the determination. For example, if person 222 is closer, image data for person 222 will obscure person 223 naturally. In this situation, the choice can be made that indicator 233 can override the overlapping portions of obscurant 332. Some of person 222 will be visible as a result, but much of person 222 will be blocked from view by person 223's body. This provides person 222 with more privacy than he would have had without tag 542, and still preserves the tracking that person 223 wants.

In various aspects, tag 542 either broadcasts or responds with a presence indication or one or more flags rather than a location. In an example, tag 542 is an RFID tag without location-receiving circuitry. Sensor 120 can include a directional antenna or a time-of-flight measurement unit to determine slant range to tag 542. Sensor 120 can include multiple spatially-separated antennas to permit triangulating the location of tag 542, or improving the accuracy of an estimate of tag 542's position. Sensor 120 or processor 186 can query triangulation ground stations, e.g., cell-phone base stations, to determine the location of tag 542. When sensor 120 detects or receives a response from such a tag 542, processor 186 deduces that there is an object in the visible polygon. If tag 542 only supplies a presence indication, processor 186 can assume a default state of the flags, e.g., do-not-track applied. Tag 542 can also return one or more flag(s) configurable by person 222, e.g., using DIP switches on tag 542. Processor 186 infers a size and shape for obscurant 332 (or an indicator) based on information received from sensor 120 about the location of tag 542. In an example, obscurant 332 covers the entirety of any frame of captured image data containing an RFID do-not-track tag 542. In another example, sensor 120 scans or otherwise determines the azimuth and elevation angles of tag 542 with respect to sensor 120, and processor 186 obscures or produces obscurant data for only a portion of the image lying in that direction from sensor 120. Processor 186 can adjust the angles, if necessary, to compensate for different locations of image-capture device 110 and sensor 120.

Figure 6:
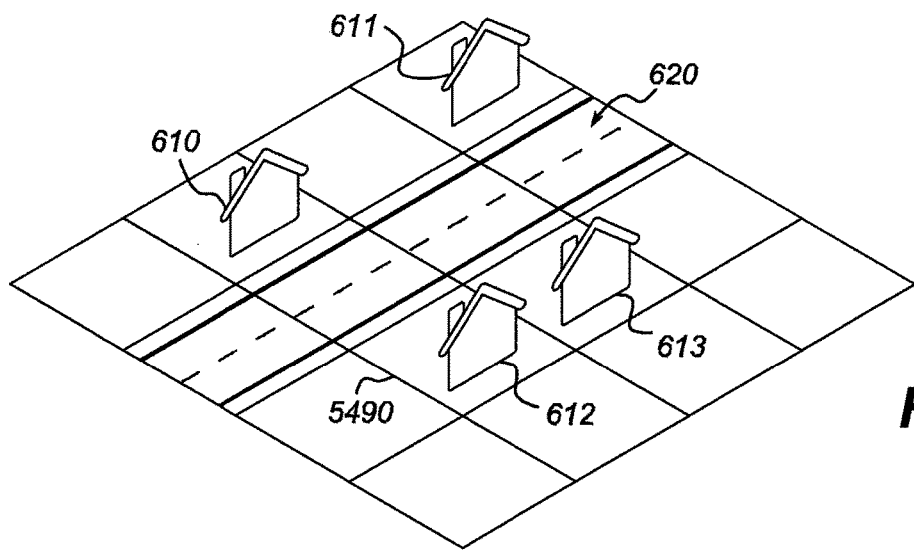
FIG. 6 is an exemplary axonometric view of a residential neighborhood.
Figure 7:
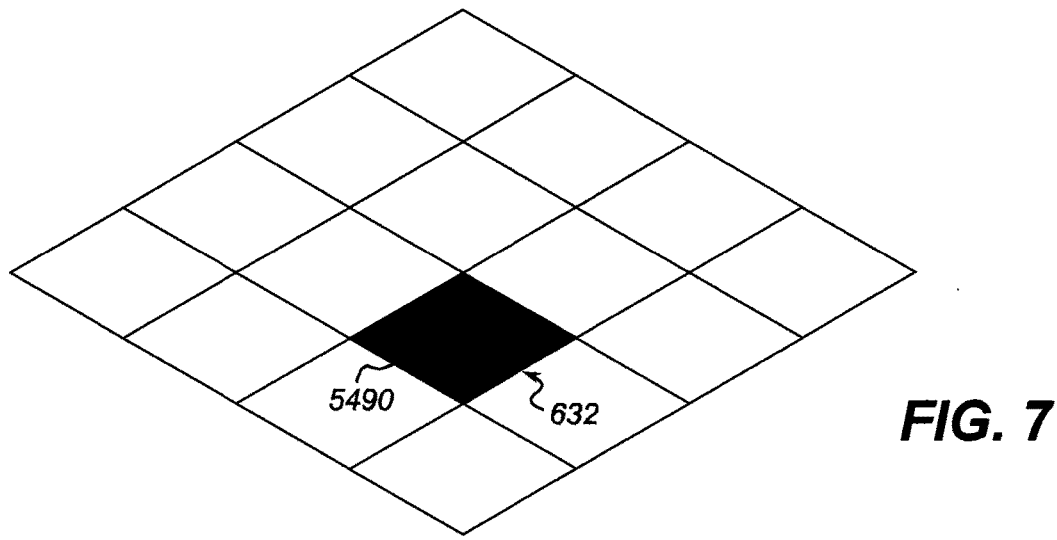
FIG. 7 is an exemplary masking layer corresponding to FIG. 6.
Figure 8:
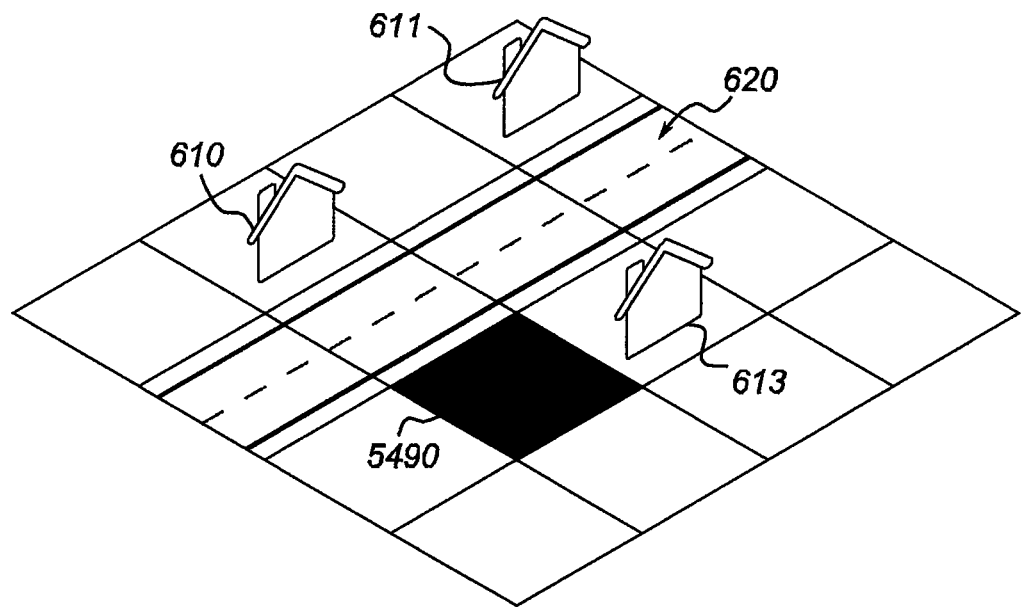
FIG. 8 is an example of the result of applying the masking layer of FIG. 7 to the view of FIG. 6.

FIGS. 6-8 show the operation of other aspects. FIG. 6 is an axonometric view of a residential neighborhood. The neighborhood shown has houses 611, 612, 613, and 614 on either side of street 620. This view is representative of an oblique perspective image of the neighborhood captured by an exemplary drone.

The grid lines in FIG. 6 represent coordinates. Perspective images can been geo-referenced or geo-rectified so that the latitude and longitude of each point in the view can be readily determined. Georeferencing includes angle correction so that coordinates can be determined for overhead images or oblique images. The grid lines can be parallel to the lines of latitude and longitude in a datum covering the neighborhood. The grid lines can be present in a captured image or added to it, or not. Data representing the grid can be stored separately. House 612 is located in grid square 5490.

FIG. 7 shows a masking layer on the same grid as FIG. 6. This is representative of a layer used in a GIS (geographical information system). The image displayed to the user of a GIS is a superimposition of various layers, starting from a base map. According to various aspects, the georeferenced masking layer represented in FIG. 7 is superimposed over the image represented in FIG. 6.

FIG. 8 shows the result of that superimposition. The view is as in FIG. 6, except that data for grid square 5490, including house 612, have been obscured by obscurant 632. The shape and size of the obscurant shown is an example. The obscurant can be the shape and size of grid square 5490 or house 613, or can be another size or shape determined as described above.

The masking layer of FIG. 7 can be stored in a database, e.g., database 599. While imaging platform 100 is operating, it can query database 599 with the visible polygon to retrieve appropriate masking layers. Processor 186 can produce obscurants or obscurant data using the retrieved masking layers. Other processing components of imaging system 190 or storage 131 can also produce the obscurants or obscurant data. The masking layers in database 599 can be updated periodically, e.g., monthly or quarterly. In various examples, the masking layer includes data masking specific parcels. That is, instead of or in addition to grid squares, the masking layer includes shapes corresponding to the shapes and positions of specific parcels or pieces of property, or specific fixed-position objects or areas. In various aspects, the masking layer can also include data specifying other flags, or other layers can be used. For example, a separate layer could include please-track flags analogous to those described above for tags 542.

In various examples, combinations of aspects described above are used. For example, a person's house can be marked "please track." This permits the person to access data about when the house was imaged by an imaging platform 100. The please-track marker can be applied by a please-track tag, as discussed above with reference to FIG. 5, or by a please-track layer, as discussed with reference to FIG. 7. The person, however, can wear a do-not-track tag 342, 542 (e.g., a beacon), as described with reference to FIG. 3 or 5. As a result, a drone capturing an image of the house will obscure the person if he is walking around his backyard. Other combinations of do-track and do-not-track can be used.

In various examples, a user registers the unique ID of tag 542, or the coordinates of a parcel, with database 599, and indicates the do-not-track flag should be set. Processor 186, during operation of imaging platform 100, queries database 599 to locate do-not-track regions in the visible polygon. Processor 186 produces obscurants (e.g., obscurant 332) or data indicating where obscurants should go. In the former situation, the modified image is transmitted to receiver 130. In the latter situation, the unmodified image and the obscurant data are transmitted to receiver 130.

Obscurants and indicators can be added by any processing component(s) of imaging system 190, e.g., processor 186 on imaging platform 100, or by a downstream component such as storage 131. The term "targets" refers to people, houses, other buildings, doors or windows of structures, plants, animals, objects, or any other matter or volume that can be associated with a flag using any of the ways described herein. Targets can be identified, e.g., by bearing tags 342 or 542, or by having their locations stored in database 599.

Figure 9:
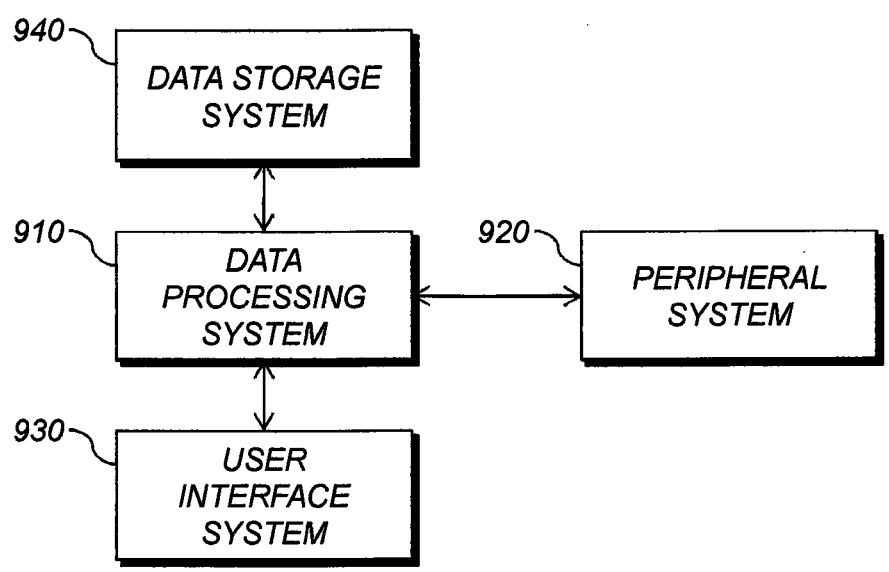
FIG. 9 is a high-level diagram showing the components of an exemplary data-processing system.

FIG. 9 is a high-level diagram showing the components of a data-processing system for analyzing image data and performing other analyses described herein. The system includes a data processing system 910, a peripheral system 920, a user interface system 930, and a data storage system 940. The peripheral system 920, the user interface system 930 and the data storage system 940 are communicatively connected to the data processing system 910. Processor 186 and receiver 130 can each include one or more of systems 910, 920, 930, 940.

Figure 15:
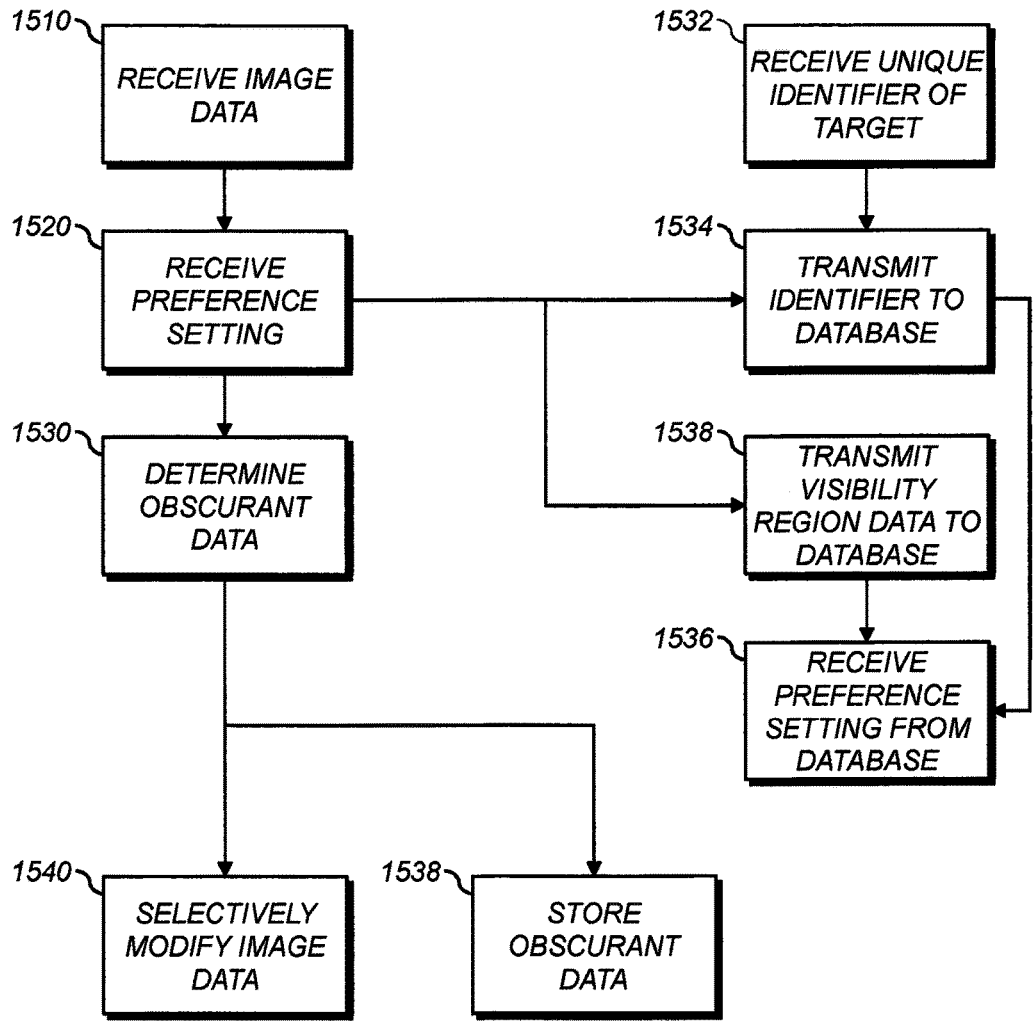
FIG. 15 shows a flowchart illustrating exemplary methods of providing obscurant data.
Figure 16:
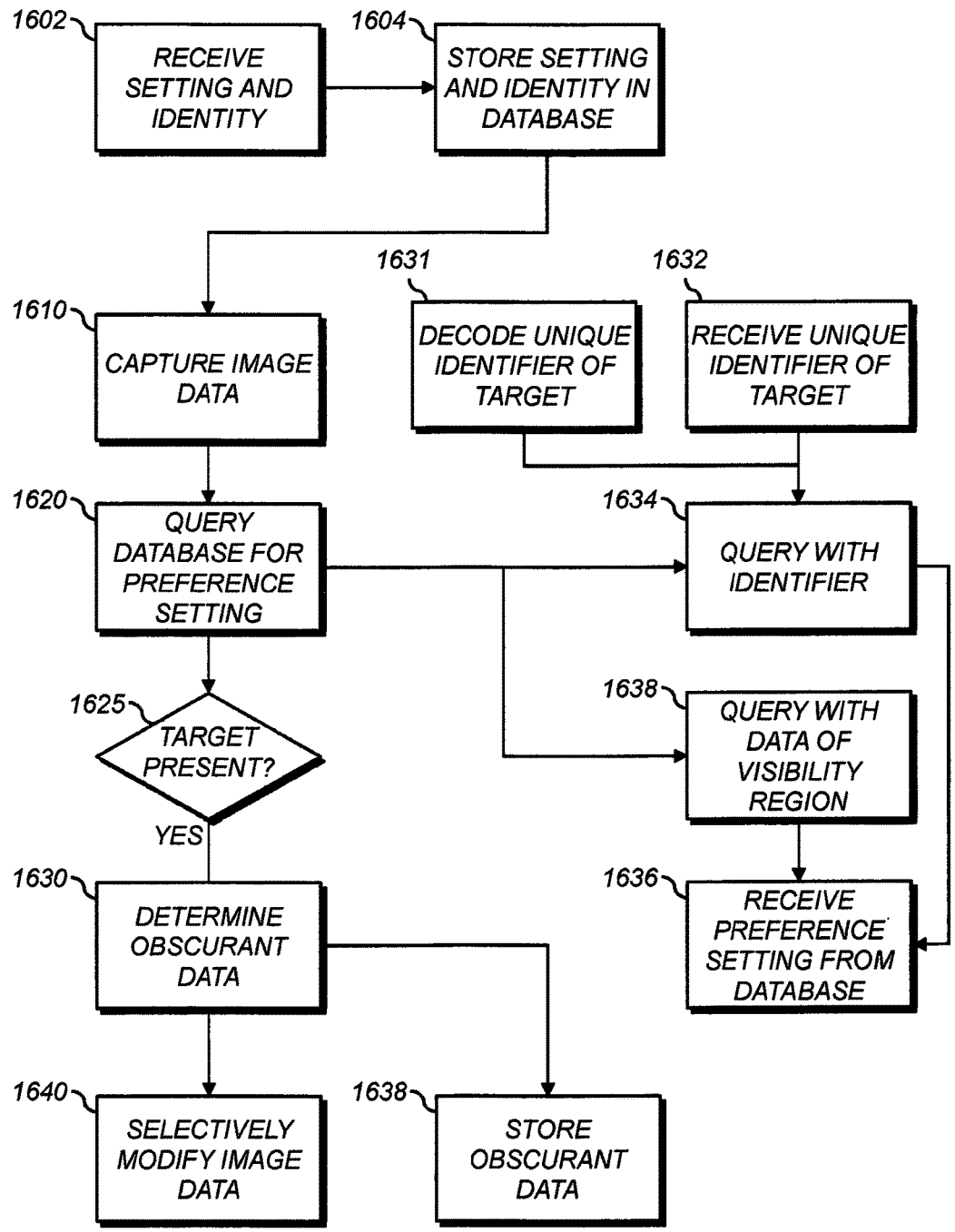
FIG. 16 shows a flowchart illustrating exemplary methods of providing surveillance image data.

The data processing system 910 includes one or more data processing devices that implement the processes of the various aspects, including exemplary processes described herein such as those shown in FIGS. 15 and 16. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 940 includes one or more processor-accessible memories configured to store information, including the information needed to execute the processes of the various aspects, including the example processes described herein. The data storage system 940 can be a distributed processor-accessible memory system including multiple processor-accessible memories communicatively connected to the data processing system 910 via a plurality of computers or devices. On the other hand, the data storage system 940 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors. In this regard, although the data storage system 940 is shown separately from the data processing system 910, one skilled in the art will appreciate that the data storage system 940 can be stored completely or partially within the data processing system 910. Further in this regard, although the peripheral system 920 and the user interface system 930 are shown separately from the data processing system 910, one skilled in the art will appreciate that one or both of such systems can be stored completely or partially within the data processing system 910.

The peripheral system 920 can include one or more devices configured to provide digital content records to the data processing system 910. For example, the peripheral system 920 can include digital still cameras, digital video cameras, cellular phones, or other data processors. The data processing system 910, upon receipt of digital content records from a device in the peripheral system 920, can store such digital content records in the data storage system 940.

The user interface system 930 can include a mouse, a keyboard, another computer, or any device or combination of devices from which data is input to the data processing system 910. In this regard, although the peripheral system 920 is shown separately from the user interface system 930, the peripheral system 920 can be included as part of the user interface system 930.

The user interface system 930 also can include a display device, a processor-accessible memory, or any device or combination of devices to which data is output by the data processing system 910. In this regard, if the user interface system 930 includes a processor-accessible memory, such memory can be part of the data storage system 940 even though the user interface system 930 and the data storage system 940 are shown separately in FIG. 9.

In view of the foregoing, aspects of the invention provide improved control by a person of data captured by surveillance systems that relates to that person. A technical effect is to provide a surveillance video stream that advantageously obscures people who do not which to be captured on video. Another technical effect of various aspects is to provide a surveillance video stream in which, because portions are obscured, un-obscured portions are more visible to the human eye, or stand out more prominently to a human observer.

As will be appreciated by one skilled in the art, aspects of the present invention may be embodied as a system, method, or computer program product. Accordingly, aspects of the present invention may take the form of an entirely hardware aspect, an entirely software aspect (including firmware, resident software, micro-code, etc.), or an aspect combining software and hardware aspects that may all generally be referred to herein as a "service," "circuit," "circuitry," "module," or "system." Furthermore, aspects of the present invention may take the form of a computer program product embodied in one or more computer readable medium(s) having computer readable program code embodied thereon.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice method(s) according to various aspect(s).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code or executable instructions embodied on a computer readable medium may be transmitted using any appropriate medium, including but not limited to wireless, wireline, optical fiber cable, RF, or any suitable combination of appropriate media.

Computer program code for carrying out operations for aspects of the present invention may be written in any combination of one or more programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Computer program instructions can be stored in a computer readable medium that can direct a computer, other programmable data processing apparatus, or other devices to function in a particular manner. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Figure 10:
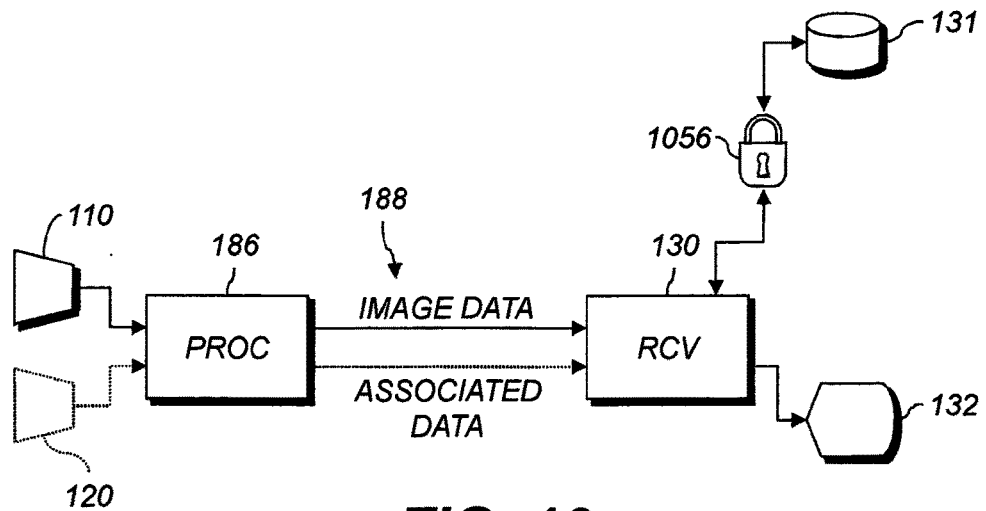
FIGS. 10-12 show various examples of operation of imaging system 190, receiver 130, and related components.
Figure 11:
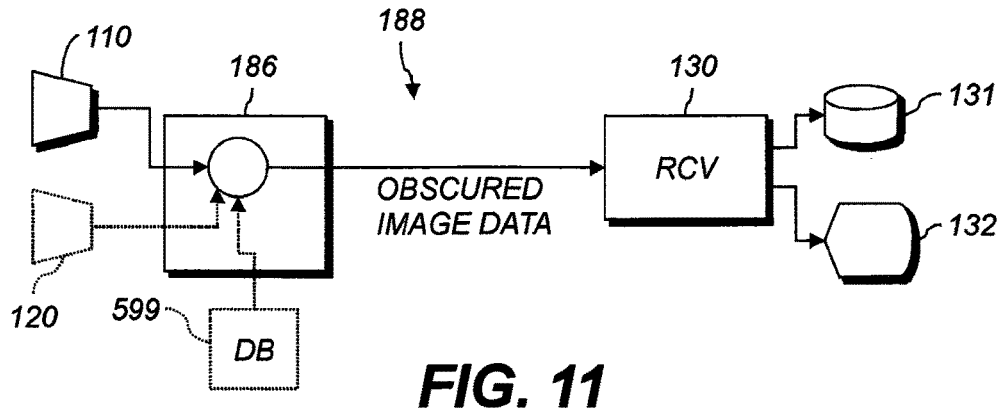
Figure 12:
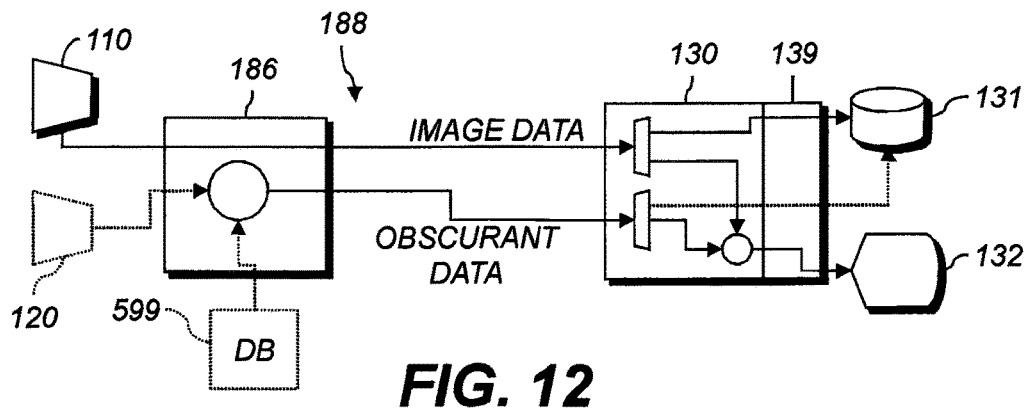

FIGS. 10-12 show various examples of operation of imaging system 190, receiver 130, and related components. Imaging system 190 is as shown in FIG. 1. FIG. 10 shows image-capture device 110 and optional sensor 120 providing data to processor 186. Processor 186 transmits image data and optionally associated data over data link 188 to receiver 130. Receiver 130 provides data to storage 131 or display 132. Associated data can include data about targets or obscurants, e.g., shapes, layers, regions, masks, or polygons defining areas of the image that contain targets or that should be obscured. In various aspects, data to and from storage pass through security unit 1056. Security unit 1056 can provide access control for storage 131, e.g., to restrict access to storage 131 to authorized users. Security unit 1056 can also provide data-integrity checks or non-repudiation. For example, data in storage 131 can be stored with checksums, secure hashes, or cryptographic signatures (e.g., RSA, PGP, or other public-key signatures, or private-key signatures) that permit detecting alterations to the stored data. Security unit 1056 can keep timestamps or audit logs of accesses to storage 131. In various aspects, security unit 1056 and storage 131 together provide tamper-evident storage of data. This permits humans using the data to avoid relying on data that have been tampered with, e.g., as evidenced by a checksum failure. Security unit 1056 can also be used in the examples shown in FIGS. 11 and 12, and in other examples herein.

FIG. 11 shows an example of obscuration being performed by processor 186 on imaging platform 100. Processor 186 receives image data from image-capture device, and receives data about the locations of targets from sensor 120, database 599, or both. Processor 186 applies obscurant(s), e.g., obscurant 332, and supplies obscured image data to receiver 130. Throughout FIGS. 11-12, empty circles represent operations performed by the component in which the circle is represented, the inputs and outputs of the operations represented by the arrows connected to the empty circles.

FIG. 12 shows an example of processor 186 determining the obscuration and receiver 130 applying the obscuration. Processor 186 provides the image data from image-capture device 110 to receiver 130 without obscuring it. (Processor 186 can modify the image data in other ways, e.g., georeferencing or adjusting resolution, contrast, or color.) Processor 186 produces obscurant data using the inputs from sensor 120 or database 599, or both, and transmits the obscurant data to receiver 130. Image data and obscurant data can be transmitted over separate data links or multiplexed on one data link. Receiver 130 supplies image data and obscurant data separately to storage 131. Receiver 130 combines the image data and the obscurant data to apply the obscurants to the image. The obscured image data is then supplied to display 132 using delivery system 139 (discussed above with reference to FIG. 1). In this way, without a court order or other human decision, only obscured data are visible. With such an order or decision, un-obscured image data can be retrieved from storage 131. In various aspects, storage 131 does not store obscurant data.

Figure 13:
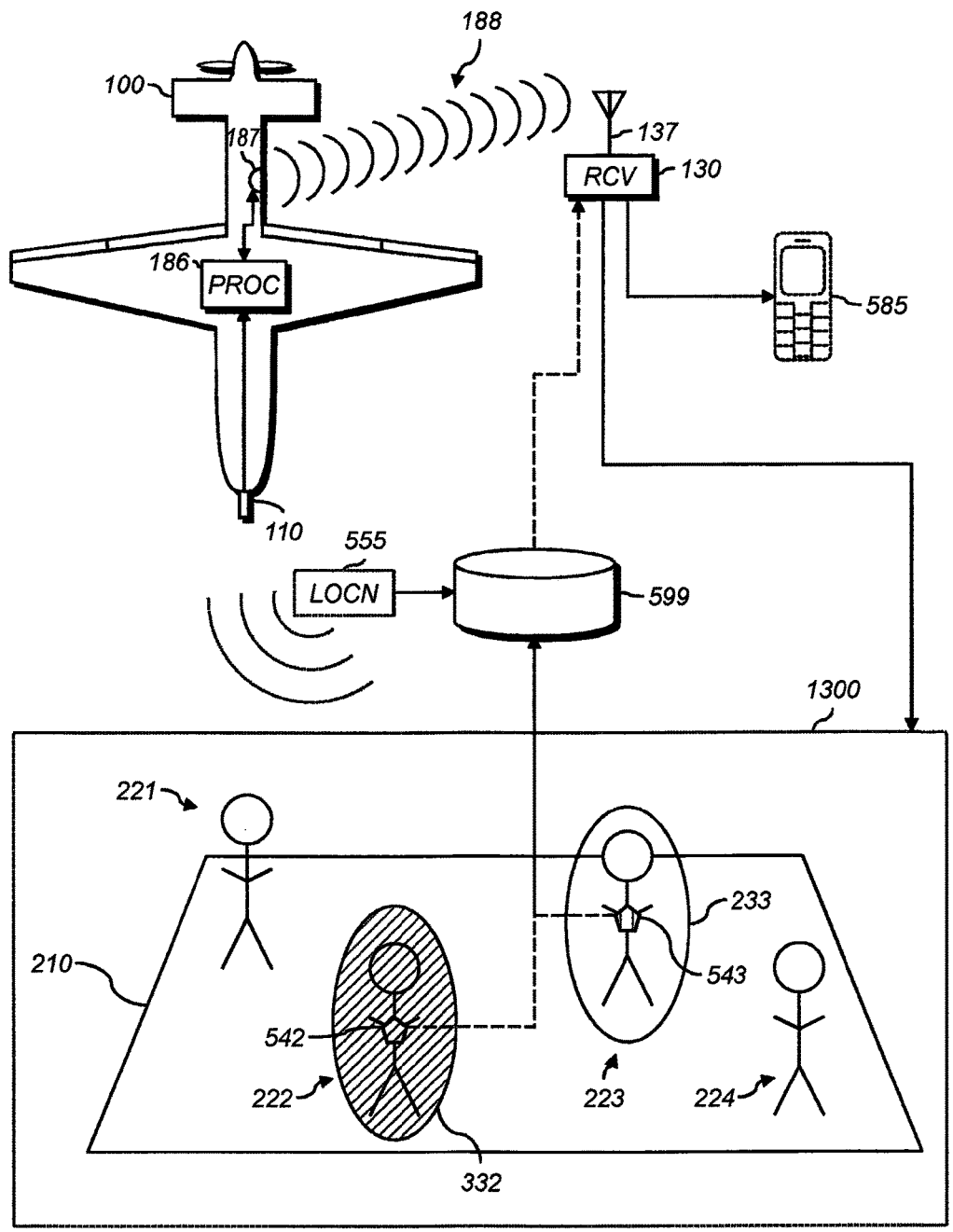
FIG. 13 shows an exemplary video frame and imaging platform according to various aspects.

FIG. 13 shows an exemplary video frame 1300 and imaging platform 100 according to various aspects. Imaging platform 100 includes, e.g., a drone such as an airplane UAV. Imaging platform 100 can also include any other type of drone or a fixed camera, e.g., a mall security camera, bridge-inspection camera, or traffic-light camera. Imaging platform 100 can be remotely controlled (non-autonomous), autonomous, or semi-autonomous, as described above.

Imaging platform 100 includes image-capture device 110, e.g., an optoelectronic device such as a CMOS or CCD image sensor, or a spectrophotometer or spectroradiometer. Image-capture device 110 provides the captured image to processor 186. Image-capture device 110 can include optical or digital zoom devices. Image-capture device 110 or other sensors can be mounted on the bottom or top of, or elsewhere on, the fuselage of an aircraft-drone imaging platform 100.

Processor 186 transmits the received image from image-capture device 110 via communications device 187, which can be as described above. Receiver 130 receives the image data from communications device 137, as discussed above.

Image-capture device 110, processor 186, communications device 187, data link 188, communications device 137 and receiver 130 together compose an imaging system as described above. In various aspects, imaging platform 100 is a "dumb drone," i.e., a system that does not apply image processing to provide obscurants or indicators as described below. In various aspects, data link 188 includes two parallel data streams: raw image data in one stream, and the location of imaging platform 100 or of visible features in the other stream.

In various aspects, receiver 130 receives image data from imaging platform 100 via data link 188 and produces video frame 500. Receiver 130 can also communicate with database 599, as discussed below. In various examples, data link 188 is one-way from the imaging platform 100 to the receiver 130. This advantageously reduces the complexity of the imaging platform 100, permitting these examples to be readily used with, e.g., microlight drones or passive surveillance cameras such as closed-circuit television (CCTV) cameras.

Video frame 1300 is an exemplary video frame produced by the imaging system according to various aspects. Surface 210, persons 221, 222, 223, 224, and other features are as discussed above with reference to video frame 500 (FIG. 5). In this example, persons 222 and 223 are of interest. Overlaid on the video frame are obscurant 332 and indicator 233, as described above with reference to FIG. 5. Obscurant 332 can be as described above with reference to FIG. 3. can modify the image data by Persons 221 and 224 are not of interest, so no indicators or obscurants, or other indicia, are shown for them. The analysis routines can determine the respective sizes of obscurant 332 or indicator 233 by inspection of the image data as described above.

Receiver 130 or another component of the imaging system can analyze the captured image data and provide outputs as described above with reference to FIG. 5. Analysis of image data can be used together with analysis or processing based on tags 542, 543.

Still referring to FIG. 13, obscurant 332 is represented graphically with a hatching pattern to show the relationship between person 222, tag 542, and obscurant 332. In various examples, obscurant 332 can be hatched or can be opaque, showing none of the image data obscured by it.

Tags 542, 543 can be placed on objects, plants, or animals in addition to on people. Tag 542, 543 can be applied, e.g., to a house or car. In various aspects, different tags 542, 543 or configurations of tags can have different meanings, as discussed below. In an example, one tag can mean "do not track me," e.g., tag 542. Another tag can mean "please do track me," e.g., tag 543. Another tag can be a distress signal. Tag 542 can be visible to image-capture device 110, but that is not required. In various aspects, tag 542 is not visible to image-capture device 110. Tag 542 includes a data terminal ("DT"), e.g., a cellular telephone or other active beacon.

In various aspects, tag 542 includes a location system adapted to determine the location of tag 542 in a selected frame of reference. The location system can include a GPS or GLONASS receiver, a triangulator that consults a database of known locations of nearby radio sources (e.g., cell-phone towers or WIFI hotspots). The location system can also include a transceiver that communicates with, e.g., a radar to receive location information determined by the radar. In an example, the radar pings tag 542 to determine azimuth, slant range, and optionally elevation, then converts those to a location in the selected frame of reference and sends them back to tag 542. In an example, tag 542 includes a cellular telephone having hardware to determine its location and software to report that location to a registry, e.g., database 599.

In other aspects, the location of tag 542 is determined outside tag 542. For example, tag 542 can include a cellular telephone or other device communicating via a cellular network. The provider of cellular service periodically triangulates the location of tag 542 using multiple base-station antennas. This can be automatically performed by a processor operated by the service provider. Equipment not part of tag 542 for detecting the location of tag 542 is represented graphically as optional location unit 555. Unit 555 can include antennas or other detection units not part of imaging platform 100 and useful for triangulating or otherwise determining the location of tag 542. In various aspects, unit 555 leverages the built-in Enhanced 911 (E911) location-determination unit that can determine the location of tag 542. Using E911 and related location technology (e.g., triangulation, global positioning system, GPS, assisted GPS, aGPS, or location fingerprinting using known locations of WIFI routers or other RF signal sources), cell-phone carriers or other communications providers can provides location information for tag 542 without requiring user intervention or action, e.g., without running a specialized smartphone app. In various aspects, unit 555 (e.g., a cellular telephone base station) receives a preference input from the user (e.g., from database 599 or another database). The user can set the preference input to determine whether the location of tag 542 should be reported or not.

In this disclosure, the system that determines the location of tag 542 is referred to as the "location provider." The location provider can be part of tag 542 or not, as discussed above.

The location provider communicates periodically or aperiodically with database 599, e.g., at intervals described above. The interval can be configured by a user, e.g., person 222. The user can configure the interval based on his velocity and desired battery life. Tag 542 or the location provider can include a user interface, e.g., a touchscreen or scroll wheel, that permits person 222 to change the interval. Tag 542 or the location provider can also interact with a World Wide Web (WWW) server or smartphone app that relays a command from the user to tag 542 to change the interval.

In various aspects, tag 542 includes a unique identifier, as described above. The location provider determines the location of tag 542 and updates database 599 with the determined location and the unique identifier.

In various of these aspects, database 599 stores unique IDs and locations received from location providers. Database 599 also stores a do-not-track flag for each unique identifier. Database 599 can store other flags for each unique identifier, and can be organized for rapid searches by location (e.g., using quadtree subdivision on latitude and longitude coordinates). Flags can be as described above.

As imaging platform 100 operates, it communicates via a link (e.g., a wireless link through communications device 187) with receiver 130. Imaging platform 100 periodically communicates to receiver 130 its location, or location(s) currently in view of image-capture device 110. For example, processor 186 can provide to receiver 130 a visibility region of image-capture device 110, i.e., the region the image-capture device 110 can see. The visibility region can be communicated as a visibility polygon, as described above.

Receiver 130 then queries database 599 with the visibility polygon. Database 599 responds to the visibility-polygon query from receiver 130 with the coordinates of each tag that is located in the visibility polygon and to which the do-not-track flag has been applied. In the example shown, database 599 provides the coordinates of tag 542 to receiver 130. Receiver 130 then modifies the image data, or produces appropriate data, to provide obscurant 332. Obscurant 332 can be a generic shape (and size), a shape or size based on the distance between image-capture device 110 and tag 542, a shape or size stored in database 599, or any combination thereof. In various aspects, processor 186 queries database 599 with the visibility polygon. Processor 186 then produces the obscurant data, or modifies the image data, to provide obscurant 332. In various aspects, receiver 130 queries database 599 with the unique ID of a tag 542 detected, e.g., using the sensor 120 (FIG. 5).

In any of the aspects described herein, data can be stored in database 599 for a selectable amount of time, e.g., 180 days. Database 599 can include flags directing data to be stored longer. When retrieving captured images from database 599 or storage 131, the flags in database 599 can be consulted to narrow down the search rapidly to unique IDs with do-track fields set. In an example, parents can set the do-track fields on tags carried by their children so that they will have a record of their children's movements.

In various aspects, video frame 500 includes do-track features of interest, or both do-track and do-not-track features of interest. In the example shown, person 223 is wearing or carrying do-track tag 543, and so is highlighted with indicator 233. Highlighting is performed by receiver 130. In various aspects, when receiver 130 queries database 599, database 599 responds with the locations of all tags in the visibility polygon, and the corresponding flags. Receiver 130 inspects the flags and produces either obscurants or indicators at the correct locations in video frame 500. Imaging platform 100 or receiver 130 can georeference or otherwise correlate pixel locations in an image from image-capture device 110 with the visibility polygon to determine where given coordinates appear in video frame 500.

In various examples, a user registers the unique ID of tag 542, or the coordinates of a parcel, with database 599, and indicates the do-not-track flag should be set. Receiver 130, during operation of imaging platform 100, queries database 599 to locate do-not-track regions in the visible polygon. Receiver 130 produces obscurants (e.g., obscurant 332) or data indicating where obscurants should go.

Obscurants and indicators can be added by any processing component(s) of the imaging system, e.g., processor 186 on imaging platform 100 or receiver 130, or by a downstream component such as a storage unit.

Figure 14:
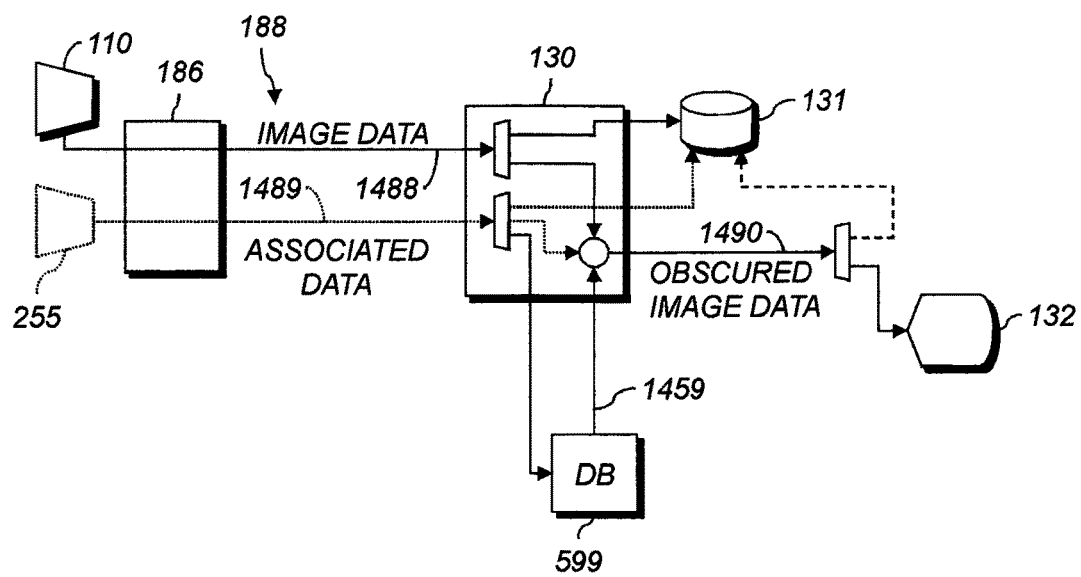
FIG. 14 is a dataflow diagram of exemplary systems for producing obscured image data.

FIG. 14 is a dataflow diagram of systems for producing obscured image data according to various aspects. Image-capture device 110 provides image data to processor 186. Optional capture-location provider 255 provides a location to which the image corresponds, e.g., the GPS coordinates and orientation (roll, pitch, and yaw) of image-capture device 110 at the time the image is captured (orientation can be determined using accelerometers). In various aspects, processor 186 does not produce obscurants, but can modify the image data in other ways, e.g., georeferencing or adjusting resolution, contrast, or color. Processor 186 transmits image data 1488 and optionally associated data 1489, e.g., the capture location from provider 255, over data link 188 to receiver 130. Empty circles represent operations performed by the component in which the circle is represented, the inputs and outputs of the operations represented by the arrows connected to the empty circles.

In various aspects, receiver 130 provides to storage 131 the image data and, separately or separably, the associated data. Receiver 130 also determines and applies obscuration(s) or indicator(s). Receiver 130 queries database 599 with the associated data, or with visible-polygon information extracted from the received image data (e.g., locations of landmarks in the image). As discussed above, database 599 can also be queried with the unique ID of a tag. The associated data can thus include identification data of the tag 542. Receiver 130 processes the image data according to the query results 1459 to provide obscured image data 1490. The term "obscured image data" includes images to which only indicators have been applied. The obscured image data is supplied to display 132, and can be stored in storage 131. In this way, without a court order or other human decision, only obscured data are visible. With such an order or decision, un-obscured image data can be retrieved from storage 131. In various aspects, storage 131 does not store obscurant data. As described above, e.g., with reference to FIG. 2, indicators can be added to the obscured image data instead of or in addition to obscurants.

In various aspects, storage 131 includes one or more data-storage device(s), e.g., hard drives, that store both un-obscured image data and obscurant data. In various aspects, storage 131 includes data-storage device(s) that store un-obscured image data and separate data-storage device(s) that store obscurant data. Storage 131 can also store obscured image data, on data-storage device(s) that also hold un-obscured image data or obscurant data, or on separate data-storage device(s).

In various aspects, cryptographic or other protection is applied so that non-obscured image data is stored in storage 131 in a tamper-evident manner. Receiver 130 delivers obscured video or images to display 132, but raw data are available from storage 131 on court order or other appropriate conditions.

In various aspects, imaging platform 100 captures images of parking lots or other areas with a limited number of assignable areas (e.g., parking spaces in a lot, camping sites in a park or campground, or hookups in an RV park). Processor 186, receiver 130, or one or more other component(s) of the imaging system analyze the image data to determine the locations of available assignable areas. These locations, or directions to them from a user's location (e.g., the location of tag 542 that includes a smartphone), are presented to the user via tag 542 or another interface. In an example, a smartphone app presents directions to the nearest available assignable area. In various aspects, the smartphone app presents image data with indicators, e.g., as shown in FIG. 13, when the nearest available assignable area is in view. In various examples, receiver 130 provides directions and images with indicators to smartphone 585 or tag 542. In various examples, phone 585 is part of receiver 130 and directly receives image data from imaging platform 100. In these latter examples, phone 585 processes data to determine the locations of indicators, and presents those indicators on the screen of phone 585.

In various examples, receiver 130 identifies targets in image data received from image-capture device 110. These targets are identified using location information stored by the targets themselves (via tag 542) in database 599. In prior schemes, users disable location functions on their smartphones to increase their privacy. In various inventive aspects described herein, users enable those location functions and report their locations regularly to database 599 to increase their privacy. In various examples, users enable location functions and report their locations to be noticed, e.g., to provide an increased sense of personal safety. Aspects described herein permit users to select whether they want to be "noticed" and tracked by a drone or want to be unobservable or unobserved by drones. Each has respective benefits and applications. In various aspects, drone imagery provides a visual confirmation of who a tracked phone or other transponder is with, what type of vehicle the phone is being transported in, or other visually-perceptible data related to the location or circumstances of the transponder.

FIG. 15 shows a flowchart illustrating exemplary methods of providing obscurant data. The steps can be performed in any order except when otherwise specified, or when data from an earlier step is used in a later step. In at least one example, processing begins with step 1510, or with step 1532. For clarity of explanation, reference is herein made to various components shown in FIGS. 1-14 that can carry out or participate in the steps of the exemplary method. It should be noted, however, that other components can be used; that is, exemplary method(s) shown in FIG. 15 are not limited to being carried out by the identified components.

Step 1510 includes receiving image data including an image of a target, e.g., as discussed above with reference to image-capture device 110. Targets can include people, buildings, or other features discussed above.

Step 1520 includes receiving a preference setting corresponding to the target, e.g., from database 599 or directly from tag 342, 542, or 543 as discussed above or. Step 1520 or other steps shown in FIG. 15 can also include transmitting to database 599 a timestamp corresponding to the image data, e.g., for logging the times of drone observation as discussed above.

Step 1530 includes determining obscurant data of at least a portion of the image data corresponding to the image of the target using the received preference setting and optionally the received image data. This can be done as discussed herein. Obscurant data can include data defining highlights or indicators as well as graphic structures to protect privacy. In various aspects, the target is selected from the group consisting of a person, a building, or an animal. In various aspects, the determining step 1530 including determining a size of the portion of the image data using the received image data, e.g., by detecting image pixels corresponding to the target using, e.g., face- or shape-recognition algorithms.

In various aspects, step 1540 includes selectively modifying the received image data according to the determined obscurant data to provide a surveillance image. The modification (e.g., applying obscurants or indicators) can be performed, e.g., by processor 186 or receiver 130. In various examples, step 1530 includes determining at least a portion of the image data to be obscured in response to a preference setting requesting privacy and step 1540 includes obscuring the determined at least a portion of the image data. In various examples, step 1530 includes determining at least a portion of the image to be indicated in response to a preference setting requesting increased visibility of the target and step 1540 includes modifying the determined at least a portion of the image data to include data of a visible indicator.

In various aspects, step 1532 includes receiving a unique identifier of the target, e.g., a GUID. Step 1520 includes step 1534 of transmitting the received unique identifier to a database and step 1536 of receiving from the database the preference setting corresponding to the unique identifier.

In various aspects, the image data correspond to a visibility region, as discussed above. Step 1520 includes step 1538 of transmitting data (e.g., a visibility polygon) of the visibility region to a database to determine whether the target is present in the visibility region. Step 1536 includes receiving from the database the preference setting or an indication that the target is not present in the visibility region. If the target is not present, steps 1530 and 1540 can be omitted.

Various aspects include step 1538 or storing the determined obscurant data in a storage device. The storage device can be a tamper-evident storage device, storage 131 with security unit 1056.

FIG. 16 shows a flowchart illustrating exemplary methods of providing surveillance image data. As discussed above, the order of steps shown and components identified are not limiting. In various examples, processing begins with one of steps 1602, 1610, 1631, or 1632.

Step 1610 includes capturing image data including an image of a target. Step 1620 includes querying database 599 to receive a preference setting corresponding to the target. Step 1630 includes determining obscurant data of at least a portion of the image data corresponding to the target or the image of the target using the received preference setting and optionally the received image data, e.g., as discussed herein. Step 1640 includes selectively modifying the received image data according to the determined obscurant data to provide the surveillance image data. This can be performed as discussed above.

In various aspects, the image data correspond to a visibility region. Querying step 1620 includes decision step 1625 of querying the database with the visibility region to determine whether a target is present in the visibility region. If the target is present, the determining and modifying steps 1630, 1640 are performed. Querying step 1620 can include step 1638 of providing to the database coordinates of a visibility polygon corresponding to the visibility region. This can be performed as discussed above.

In various aspects, querying step 1620 includes receiving from the database data a masking layer representing one or more area(s) to be masked, e.g., as discussed above with reference to FIGS. 6-8. Determining step 1630 includes determining coordinates in the image data corresponding to the area(s).

In various aspects, steps 1602 and 1604 precede step 1620. In step 1602, the preference setting and an identity of the target are received. In step 1604, the received setting and identity are stored in database 599. This can be done as discussed above, e.g., by providing a Web or telephone interface a user can employ to register a preference regarding obscuring or indicating.

In various aspects, step 1632 includes receiving a unique identifier corresponding to the target, e.g., from sensor 120, a location provider (e.g., a cellular telephone service provider), or analysis of the image data of the tag. In various aspects, step 1632 includes transmitting a radio-frequency (RF) interrogation signal and receiving an RF identification signal in response, the RF identification signal including data of the unique identifier. Querying step 1620 includes step 1634 of transmitting the unique identifier to the database.

Various aspects of the image analysis described in the previous paragraph include locating a tag of the target in the image data, e.g., as discussed above, and decoding a target identifier of the tag. These aspects are useful with tags configured so that the target identifier is visually represented in the image data. Querying step 1620 includes transmitting the decoded target identifier to the database 599. In other aspects, the barcode indicates a preference setting or a group of people sharing a common preference setting. In various aspects described herein, a unique identifier can identify a group of people or targets. The barcode or other visual representation can include instructions to the drone. In an example, the information in the representation corresponds to a policy setting stored in database 599, such as a validity period. For example, a barcode with the data "42" can correspond to a record indicating that privacy from drones is permitted during certain hours of the day or certain days of the year, or in certain locations. The number "42" can be, e.g., worn as a barcode by a number of people. The data "42" can be encrypted, signed, or both. "42" can be a database key. All people wearing the same code are treated the same way by the imaging platform 100. Tags can also correspond to security keys. In an example, police cars have specific tags for each day. The data in a barcode can be cryptographically signed to authenticate it against the database 599 or another central authority. Digital signatures can be stored and transmitted as part of the unique ID or can be stored or transmitted separately. All the aspects described in this paragraph apply to non-visible tag IDs such as RF-transmitted group or policy IDs. All the aspects described in this paragraph apply to individuals as well as groups. Group codes advantageously retain some anonymity of individuals even though the group membership can be tracked. Group membership can be recorded with preference settings or separately from preference settings. Validity periods and cryptographic signatures can be combined, e.g., to ensure that validity periods are not forged. Data indicating the validity period or other policy settings, and cryptographic signatures corresponding to those settings, can be stored on the tag 542, in database 599, or in other data storage systems 940. For example, the tag can include cryptographically-signed data of its validity period. Revocation lists as known in the art can be used to indicate that a selected tag or unique ID should not be considered valid even if that ID is correctly signed. In various examples, the identifier can be associated with validation information, e.g., validity period, signature, or issuing authority. Methods described herein, e.g., FIGS.

15 and 16, can further include receiving an identifier of the target and validation information of the identifier and determining whether a use of the identifier satisfies the validation information, e.g., by testing the date or signature as described above.

In various examples, an image-capture system provides image data to a processor. The processor determines obscurant data and provides the obscurant data to the image-capture system. The image-capture system then modifies the image data according to the obscurant data to provide the surveillance image data.

In various examples, a copy of the data in database 599 is uploaded into a data storage system 940 in the imaging platform 100. This permits the imaging platform 100, in various examples, to operate without transmitting any RF signals that might alert a criminal to the presence of a surveillance device. The imaging platform 100 can operate autonomously and internally record image data and obscurant data for later retrieval.

In various examples, the database 599 pushes data to imaging platform 100 (or receiver 130, and likewise throughout this paragraph). Imaging platform 100 can register with database 599 to receive updates relevant to, e.g., a certain geographical area (or target type, e.g., people or houses; or unique-ID range or another feature; or all data known to the database), and database 599 can transmit unique IDs, coordinates, obscurant data, preference settings, or other information to imaging platform 100, e.g., as targets move in and out of the geographical area (or other registered category). Database 599 can provide updates in groups of one or more records per transmission. Database 599 can push data, or imaging platform 100 can pull data, on a schedule or on demand.

In various examples, imaging platform 100 includes a security system, e.g., for an office, mall, or other space with controlled access to one or more area(s). Employees or other authorized persons can be issued do-not-track tags and targets can be recorded if not tagged, or visitors or other persons not authorized can be issued do-track tags and targets not recorded unless tagged. In either situation (or other combinations) the privacy of authorized persons is protected and the activities of others (e.g., members of the general public) are recorded.

In various examples discussed above, the tag has a visible barcode or other visual representation of a unique ID. Imaging platform 100 (or receiver 130) can recognize the barcode in the image data, decode the barcode to determine the unique ID, and look up the unique ID in database 599 or perform other processing described above.

A surveillance system can comprise a storage system storing an identifier of a target and a corresponding preference setting; an image-capture device that produces image data of a scene; a targeting device for locating a target in the image data and, if a target is located, providing an identifier of the located target; and a processor that receives the image data from the image-capture device and the provided identifier from the targeting device, the processor configured to retrieve from the storage system the preference setting corresponding to the provided identifier and selectively modify at least a portion of the image data corresponding to the located target based on the preference setting.

The targeting device can include the processor. The system can include a display configured to receive and display the modified image data from the processor. The processor can be configured to obscure the at least a portion of the image data in response to a preference setting requesting privacy. The system can include a user interface or other device for receiving the preference setting from a user and storing the identifier of the target and the received preference setting in the storage system. The user interface can include a processor configured to transmit the identifier of the target and the received preference setting to the storage system via a network.

A tag can be configured to provide the identifier of the located target. The tag can include a visible indication of the identifier of the located target, and the targeting device can be configured to locate the visible indication in the image data and determine the identifier of the located target using the image data corresponding to the visible indication. The targeting device can be configured to locate specific colors, shapes, or other visual features in the image data of a frame. The tag can include a transponder configured to provide a radio-frequency (RF) identification signal of the identifier of the located target, and the targeting device can include an RF receiver configured to receive the RF identification signal. The targeting device can include transmission electronics configured to provide an RF interrogation signal to the tag, the tag configured to transmit the RF identification signal in response to the RF interrogation signal. The targeting device can be configured to determine at least a portion of the image data corresponding to the located target by measuring the RF identification signal and detecting a location of the tag with reference to the image-capture device using the measurements.

The system can include a location provider configured to provide location data of the tag. The storage system can be further configured to store the location data in association with the identifier of the target. The image-capture device can be configured to provide visibility data of a spatial region corresponding to the scene, e.g., a visibility polygon. The targeting device can be configured to provide the visibility data to the storage system and retrieve from the storage system the identifier of the target if the target can be within the spatial region.

In various examples, the spot can be indicated by the stored location instead of using the image data. For example, the targeting device can be further configured to retrieve the stored location data of the target if the target is within the spatial region. The processor can be further configured to determine the at least a portion of the image data using the retrieved location data and the visibility data, e.g., to map the coordinates onto the visibility polygon and project onto the image as is known in the 3-D graphics-processing art.

The tag can include the location provider and be configured to transmit the location data and the identifier of the located target to the storage system. The tag can include a cellular telephone, e.g., running an app. The tag can include a transponder configured to provide a radio-frequency (RF) identification signal of the identifier of the located target, and the location provider can include one or more RF receiver(s) configured to receive the RF identification signal and determine the location of the tag. For example, if the tag includes a mobile telephone or other wireless communications terminal, a provider of network connectivity for the terminal can use triangulation or other techniques to spatially locate the terminal. The target can be a person or a building.

In various examples, obscuring or indicated are performed on the imaging platform 100. The platform includes an optoelectronic image-capture device 110 that produces image data of a scene and visibility data of a spatial region corresponding to the scene, e.g., a visibility polygon. A tag sensor 120 is configured to detect one or more tag(s) in the spatial region and to detect respective unique identifier(s)

(UIDs) of the detected tag(s), A communications interface is configured to communicate with a storage system. A processor is adapted to receive the image data and the UID(s), retrieve respective preference setting(s) for the UID(s) from the storage system via the communications interface, and selectively modify portion(s) of the image data corresponding to the detected tag(s) in response to the respective preference setting(s).

In various examples, obscuring or indicating are performed using information provided by the platform 100. In some examples, the imaging platform 100 include an optoelectronic image-capture device 110 that produces image data of a scene and visibility data of a spatial region corresponding to the scene, e.g., a visibility polygon. A tag sensor 120 detects one or more tag(s) in the spatial region and detects respective unique identifier(s) (UIDs) of the detected tag(s). A communications interface is configured to provide the image data and the UIDs of the tags to a receiver. The tag sensor can be further configured to detect respective location(s) of the tag(s) and the communications interface can further be configured to provide the location(s) to the receiver.

In various examples, an imaging system for providing an image can include a database 599 storing information about whether to modify image data corresponding to a target. An optoelectronic image-capture device can produce image data. A processor can receive the image data and provides the image. A targeting device can determine that a target is present in a frame of image data captured by the image-capture device. This can be done by, e.g., face recognition or feature recognition, or other techniques described above. The processor in some examples is responsive to the targeting device to, when the target is present in the frame, query the database to determine whether to modify the image data for a particular target. The database provides a query response including a preference setting when the target is present, and the processor modifies the image data only if the preference setting indicates such modification should be performed. (Note that obscuring some data automatically highlights the non-obscured data, which an observer might be interested in, as discussed above.) The processor selectively modifies at least a portion of the image data of that frame corresponding to the detected target based on the query result.

Various combinations of the above can be used. For example, determining a query for the database, performing the database query, producing obscurant data, and modifying the image according to the query results and the detected target(s) can be performed in any order, subject to constraints resulting from one operation providing data that is input to another operation. The steps or portions of the steps can be performed by any components of imaging system 190, as discussed above. Data can be passed both ways between the components, e.g., back and forth between the platform 100 and the receiver 130 or processors (e.g., processor 186) in those components. The processor 186 can query the database and provide the preference setting to the receiver 130. The processor 186 can provide obscurant data. The processor 186 can detect tags and provide identifiers to the receiver 130, which can query the database. The processor 186 can provide no information beyond image data to the receiver 130. In various examples, the image captured by the imaging platform 100 includes image data of known objects or landmarks, and the receiver 130 locates those image data, determines the position of the imaging platform 100 at the time of capture by projecting the image data onto the known coordinates of the landmarks, and determines a visibility polygon from the determined position or the positions of the landmarks. In various examples, the image from the imaging platform 100 includes images of tags, e.g., tag 342, and the receiver 130 locates the tags in the images, determines the unique identifiers, and queries the database.

In various examples, sensor 120 produces a sensor image having a known relationship with the image data (e.g., of a human-visible image) captured by image-capture device 110. For example, sensor 120 can include an infrared (IR) camera or a directional antenna, and the sensor image can represent intensity of IR or RF emission, respectively. The processor 186 or the receiver 130 can determine the locations or identifications of tags using the sensor image and then apply obscurants to the image data. Conventional image-processing techniques such as projection and affine transforms can be used to map pixel locations in the sensor image to pixel locations in the image data.

In various example, image-capture device 110 produces a false-color image, e.g., of infrared or ultraviolet light, X-rays, magnetic resonance images, computed tomography images, or other radiation or energy. The image data thus represent a view of one or more target(s) other than, or in addition to, a visible-light view. Obscurants or indicators can be added to this image as described above for a visible image.

In various examples, a surveillance device or system is connected via a wired or wireless link to a monitor console. The surveillance device transmits image data to the monitor console. The surveillance device can also transmit location data, e.g., which way the camera on the surveillance device is pointing, or what the camera is presently viewing. The surveillance device can also transmit data of parts of the scene (e.g., latitude and longitude, or references to stationary or other features visible in the image, e.g., fiducials, buildings, or columns within a building) or parts of the image (e.g., x and y coordinates) that should be represented on the monitor console with a varied graphic appearance, e.g., superimposed with a feature to render a subject visible in the image data more or less visible. The surveillance device can also transmit image data having such variations applied. The monitor console can alternatively perform this processing, or the monitor console and surveillance device can share the processing.

The monitor console or surveillance device can locate subjects of interest or potential interest in the image data or field of view of the camera. Alternatively, a separate locator device, circuit, or program can locate subjects of interest or potential interest.

In various examples, the surveillance device or system is an example of an imaging platform 100 or imaging system 190. The monitor console is an example of a receiver. The varied graphic appearance is an example of an obscurant or highlight. The subject is an example of a target.

The invention is inclusive of combinations of the aspects described herein. References to "a particular aspect" and the like refer to features that are present in at least one aspect of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

In another embodiment the invention is a surveillance drone system where the drone carries the means for analyzing image data it is acquiring and applying filters to obscure the identity of individuals who are not the approved targets of surveillance, or in the alternative to obscure image data for areas outside of approved target areas of surveillance. In cases where neither an individual target nor an area target is within the surveillance the drone system would not transmit or record surveillance data. In such cases the only transmission would be of image data for the purposes of remotely piloting the drone.

In another embodiment the system would not transmit surveillance data, and would only store obscured surveillance date on the drone. Review of the surveillance would require data transfer after the drone had completed flight, and then only the obscured data would be available.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A surveillance data processing system comprising one or more hardware computing devices storing computer program instructions that, upon execution, cause the one or more hardware computing devices to:
   receive image data captured at a first time by an imaging device of a drone, the image data representing a surveillance area visible to the drone at the first time;
   determine, based at least in part on the image data, that a first tag and a second tag different from the first tag are present in the surveillance area at the first time, wherein the first tag is not a unique identifier of any specific object present in the surveillance area, and wherein the second tag is associated with a first preference setting indicating that targets associated with the second tag are to be highlighted;
   identify a first target appearing in the image data, the first target representing a first object bearing the first tag;
   identify a first portion of the image data that is associated with the first target;
   identify a second target appearing in the image data, the second target representing a second object that is present in the surveillance area at the first time and is associated with the second tag;
   identify a second portion of the image data that is associated with the second target;
   transform the first portion of the image data using obscurant data and the second portion of the image data using a highlighting indicator to produce surveillance image data comprising an image of the surveillance area at the first time wherein the first object is obscured and visibility of the second object is increased, wherein to transform the first portion and add a highlighting indicator to the second portion of the image data, the one or more hardware computing devices execute the computer program instructions to:
      determine that the first portion of the image data and the second portion of the image data overlap at an overlapping portion;
      receive information identifying, in the surveillance area, a first location of the first object and a second location of the second object;
      determine which of the first location and the second location is closer to the imaging device at the first time;
      responsive to a determination that the first location is closer to the imaging device than the second location, modify the overlapping portion with the obscurant data and not the highlighting indicator; and
      responsive to a determination that the second location is closer to the imaging device than the first location, modify the overlapping portion to include the highlighting indicator and not the obscurant data; and
   send the surveillance image data to a display device in communication with the one or more hardware computing devices.

2. A surveillance data processing system comprising one or more hardware computing devices and a database accessible by the one or more hardware computing devices and storing a plurality of records each including:
   a corresponding unique identifier of a plurality of unique identifiers; and
   one or more preference settings describing a desired manipulation of image data;
   the one or more hardware computing devices storing computer program instructions that, upon execution, cause the one or more hardware computing devices to:
   before receiving image data captured at a first time by an imaging device of a drone, the image data representing a surveillance area visible to the drone at the first time:
      generate a user interface enabling a user to enter the corresponding one or more preference settings for one or more of the plurality of records;
      send the user interface to a user interface system for display to the user;
      receive, from the user interface system, user input comprising a first preference setting indicating that the desired manipulation of image data is to highlight targets tagged with the first preference setting; and
      store the first preference setting with a first unique identifier of the plurality of unique identifiers in a first record of the plurality of records;
   receive the image data;
   determine, based at least in part on the image data, that a first tag and a second tag different from the first tag are present in the surveillance area at the first time, wherein the first tag is not a unique identifier of any specific object present in the surveillance area;
   identify a first portion of the image data that depicts a first object bearing the first tag;
   determine that the second tag includes the first unique identifier;
   query the database using the first unique identifier to retrieve the first preference setting from the first record;
   identify a second portion of the image data that depicts a second object associated with the second tag; and
   transform the first portion of the image data using obscurant data and the second portion of the image data using a highlighting indicator to produce surveillance image data comprising an image of the surveillance area at the first time wherein the first object is obscured and visibility of the second object is increased.

3. A surveillance data processing system comprising one or more hardware computing devices storing computer program instructions that, upon execution, cause the one or more hardware computing devices to:
   receive image data captured at a first time by an imaging device of a drone, the image data representing a surveillance area visible to the drone at the first time;
   receive sensor data captured at the first time by a sensor of the drone;
   determine, based at least in part on the image data and the sensor data, that a first tag is present in the surveillance area at the first time, wherein the first tag is not a unique identifier of any specific object present in the surveillance area and the first tag emits a signal that is detectable by the sensor;

identify a first target appearing in the image data, the first target representing a first object bearing the first tag;

identify a first portion of the image data that depicts a first object bearing the first tag;

determine that the sensor data includes a first value of a first flag, the first value set by a switch on the first tag;

determine that the first value indicates the first object bearing the first tag is to be obscured;

transform the first portion of the image data using obscurant data to produce surveillance image data comprising an image of the surveillance area at the first time wherein the first object is obscured; and send the surveillance image data to a display device in communication with the one or more hardware computing devices.

4. The system of claim 3, wherein the first tag has a color represented in the image data, and to determine that the first tag is present in the surveillance area at the first time, the computer program instructions, upon execution, cause the one or more hardware computing devices to:

identify the color based on data stored in memory of the one or more hardware computing devices; and determine that a plurality of adjacent pixels in the image data have the color.

5. A surveillance data processing system comprising one or more hardware computing devices and a database accessible by the one or more hardware computing devices and storing data representing a grid, the grid comprising grid lines that represent geographic coordinates in the surveillance area and define a plurality of grid squares each representing a corresponding region of the surveillance area, the one or more hardware computing devices storing computer program instructions that, upon execution, cause the one or more hardware computing devices to:

receive image data captured at a first time by an imaging device of a drone, the image data representing a surveillance area visible to the drone at the first time;

associate the grid with the image data;

determine, based at least in part on the image data, that a first tag is present in the surveillance area at the first time, wherein the first tag is not a unique identifier of any specific object present in the surveillance area;

determine that a location of the first tag is represented in the image data located within a first grid square of the plurality of grid squares;

transform the image data located within the first grid square using modification data associated with the first tag to produce surveillance image data; and send the surveillance image data to a display device in communication with the one or more hardware computing devices.

6. The system of claim 5, wherein the database further stores a plurality of masking layers each associated with the grid and each comprising obscurant data within one or more of the grid squares, wherein to transform the image data located within the first grid square, the one or more hardware computing devices further execute the computer program instructions to:

query the database to retrieve a first masking layer of the plurality of masking layers, the first masking layer having the obscurant data within the first grid square; and superimpose the first masking layer over the image data to produce the surveillance image data.

* * * * *